(12) United States Patent
Mino et al.

(10) Patent No.: US 6,927,776 B2
(45) Date of Patent: Aug. 9, 2005

(54) DATA TRANSFER DEVICE AND METHOD

(75) Inventors: Yoshiteru Mino, Osaka (JP); Masanori Henmi, Kyoto (JP); Kenji Matsushita, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 204 days.

(21) Appl. No.: 10/146,892

(22) Filed: May 17, 2002

(65) Prior Publication Data

US 2003/0006992 A1 Jan. 9, 2003

(30) Foreign Application Priority Data

May 17, 2001 (JP) ........................................ 2001-148277
Jul. 9, 2001 (JP) ........................................ 2001-207508

(51) Int. Cl.[7] .............................................. G06F 13/00
(52) U.S. Cl. ...................................................... 345/538
(58) Field of Search ................................ 345/538, 530, 345/537, 541, 539, 540, 545, 546

(56) References Cited

U.S. PATENT DOCUMENTS

| | | | |
|---|---|---|---|
| 5,301,272 A | 4/1994 | Atkins | |
| 5,640,545 A | 6/1997 | Baden et al. | |
| 5,805,778 A | 9/1998 | Suzuki | |
| 5,838,955 A | * 11/1998 | Childers et al. | ............ 710/113 |
| 6,091,431 A | * 7/2000 | Saxena et al. | ............... 345/535 |
| 6,550,014 B2 | * 4/2003 | Satoh et al. | ................. 713/501 |
| 6,677,950 B1 | 1/2004 | Ohba et al. | |

FOREIGN PATENT DOCUMENTS

| | | |
|---|---|---|
| JP | 08-050573 | 2/1996 |
| JP | 10-320345 | 4/1998 |

* cited by examiner

*Primary Examiner*—Matthew C. Bella
*Assistant Examiner*—Mackly Monestime
(74) *Attorney, Agent, or Firm*—McDermott Will & Emery LLP

(57) ABSTRACT

The data transfer device for transferring data between a system bus and a local memory having a frame buffer region and a general region includes an interface section and a data processor. The interface section generates a transfer parameter for accessing one of the frame buffer region and the general region based on control data for controlling data transfer sent from the system bus and outputs the generated transfer parameter, in addition to transferring data to/from the system bus. The data processor generates an address of data to be transferred in the local memory according to the transfer parameter, and transfers data to/from the local memory using the generated address, in addition to transferring data to/from the interface section.

5 Claims, 27 Drawing Sheets

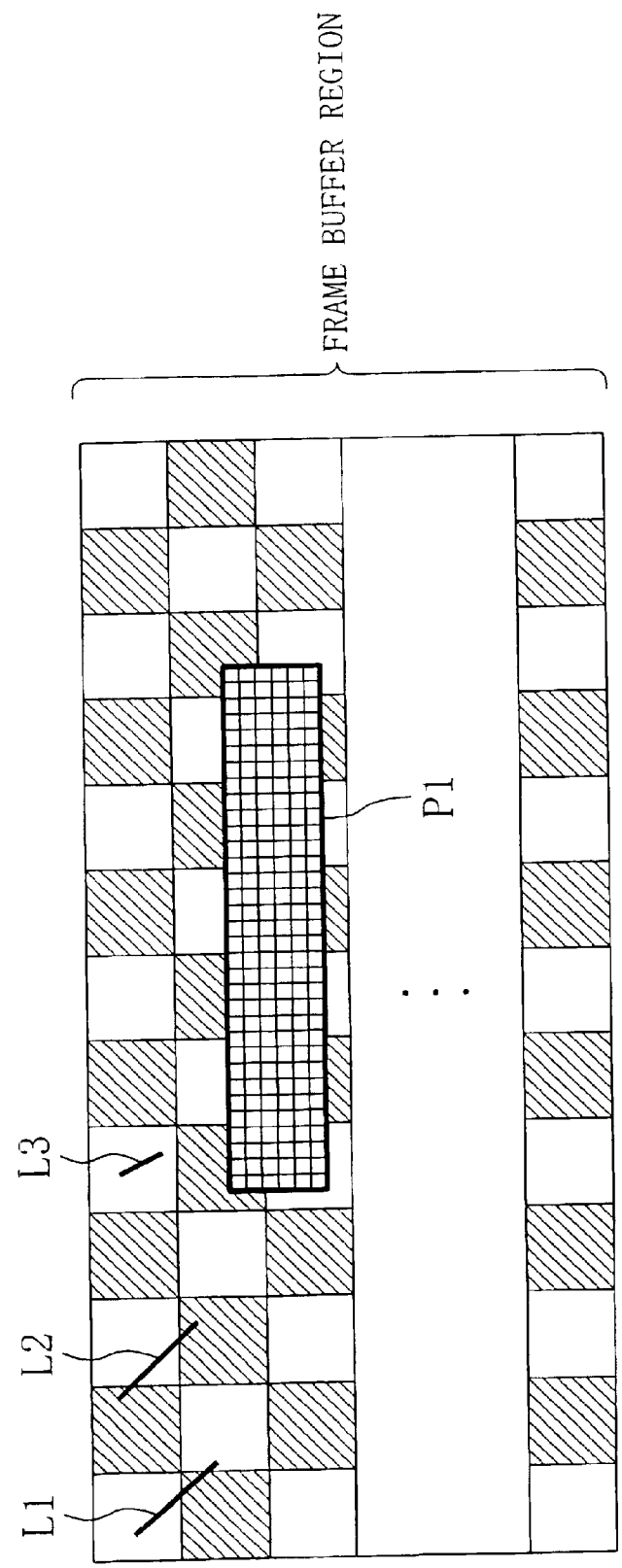

FIG. 12A

| Horizontal width of image | Width of XB (including the lower bits "00") | Width of YB |
|---|---|---|
| 1~32pixels | 5bits | 27bits |
| 33~64pixels | 6bits | 26bits |
| 65~128pixels | 7bits | 25bits |
| 129~256pixels | 8bits | 24bits |
| 257~512pixels | 9bits | 23bits |
| 513~1024pixels | 10bits | 22bits |

FIG. 12B

| Horizontal width of image | Width of XB (including the lower bits "00") | Width of YB |
|---|---|---|
| 1~32pixels | 6bits | 26bits |
| 33~64pixels | 7bits | 25bits |
| 65~128pixels | 8bits | 24bits |
| 129~256pixels | 9bits | 23bits |
| 257~512pixels | 10bits | 22bits |
| 513~1024pixels | 11bits | 21bits |

FIG. 12C

| Horizontal width of image | Width of XB (including the lower bits "00") | Width of YB |
|---|---|---|
| 1~32pixels | 7bits | 25bits |
| 33~64pixels | 8bits | 24bits |
| 65~128pixels | 9bits | 23bits |
| 129~256pixels | 10bits | 22bits |
| 257~512pixels | 11bits | 21bits |
| 513~1024pixels | 12bits | 20bits |

FIG. 13

CONTROL REGISTER ADDRESS

| 0 | DESTINATION HEAD ADDRESS |
|---|---|
| 1 | NUMBER OF WORDS TO BE TRANSFERRED |
| 2 | DMA START FLAG |
| 3 | FORMAT INFORMATION |

FIG. 14

| FRAME_NO | X_WIDTH | RASTER_ON | PIXEL_TYPE |
|---|---|---|---|

AT=0
    HostDmaStart

AT=0
    HostDmaLength

AT=1
    HostDmaStart

AT=1
    HostDmaLength

FIG. 18

| Field Name | Number of bits | Function |
|---|---|---|
| AT | 1 | Attribute of a region in local memory<br>0 : General region<br>1 : Frame buffer region |
| FM | 4 | Selection of frame memory<br>0000 : FM0<br>0001 : FM1<br>0010 : FM2<br>0011 : FM3<br>0100 : FM4<br>0101 : FM5<br>0110 : FM6<br>0111 : FM7<br>1000 : FM8<br>1001 : FM9<br>1010 : FM10<br>1011 : FM11 |
| RW | 1 | Specify Read/write<br>0 : Write<br>1 : Read |
| X | 8/11 | DMA start address<br>AT=0 : Lower bits of the address<br>AT=1 : X coordinate |
| Y | 14/10 | DMA start address<br>AT=0 : Upper bits of the address<br>AT=1 : Y coordinate |
| Length | 5/11 | AT=0 : Number of words to be DMA-transferred<br>AT=1 : Number of pixels to be DMA-transferred |

FrameMemory0

| Field Name | Number of bits | Function |
|---|---|---|
| F0add | 14 | Base address of frame memory FM0. Row address of the origin of the coordinate system is designated. |
| F0color | 3 | Number of bits per pixel<br>000 : 8bit/pixel<br>001 : 16bit/pixel<br>010 : 24bit/pixel |
| F0Xfm | 7 | Size of frame memory in the X direction<br>In units of 32 pixels<br>Odd value is set. |

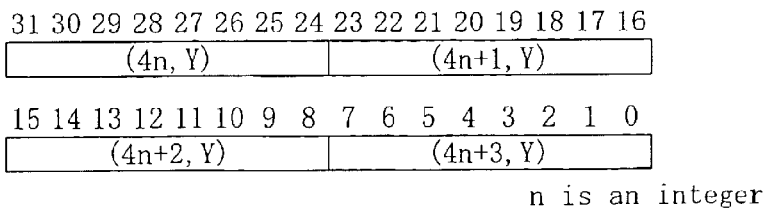
FIG. 21A
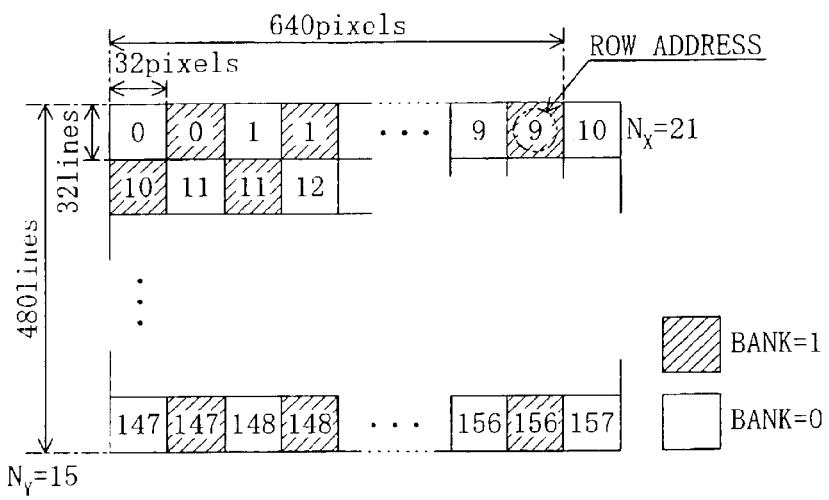
FIG. 21B
| Screen size | $N_X$ | $N_Y$ | Number of bits |
|---|---|---|---|
| 320×240 | 11 | 8 | 720,896 |
| 400×240 | 13 | 8 | 851,968 |
| 640×480 | 21 | 15 | 2,580,480 |
| 800×480 | 25 | 15 | 3,072,000 |
| 960×480 | 31 | 15 | 3,809,280 |
| 1280×960 | 41 | 30 | 10,076,160 |
| 1920×960 | 61 | 30 | 14,991,360 |
FIG. 21C
$$\text{RowAddress} = \frac{1}{2}\left(\frac{Y}{32} \times N_X + \frac{X}{32}\right)$$
$$\text{Bank} = \left(\frac{Y}{32} \times N_X + \frac{X}{32}\right) \% 2$$
$$\text{ColumnAddress} = (Y \% 32) \times 8 + \left(\frac{X}{4}\right) \% 8$$
FIG. 21D n is an integer

FIG. 22C

| Screen size | $N_X$ | $N_Y$ | Number of bits |
|---|---|---|---|
| 160×120 | 5 | 8 | 327,680 |
| 176×120 | 7 | 8 | 458,752 |
| 352×240 | 11 | 15 | 1,351,680 |
| 720×480 | 23 | 30 | 5,652,480 |

FIG. 22D $$\text{RowAddress} = \frac{1}{2}\left(\frac{Y}{16} \times N_X + \frac{X}{32}\right)$$

$$\text{Bank} = \left(\frac{Y}{16} \times N_X + \frac{X}{32}\right) \% 2$$

$$\text{ColumnAddress} = (Y \% 16) \times 16 + \left(\frac{X}{2}\right) \% 16$$

FIG. 23A
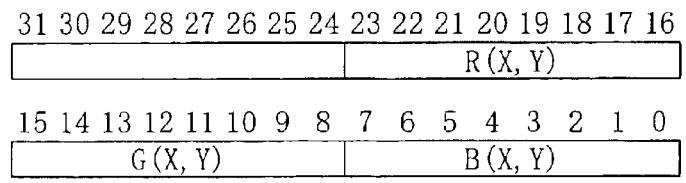
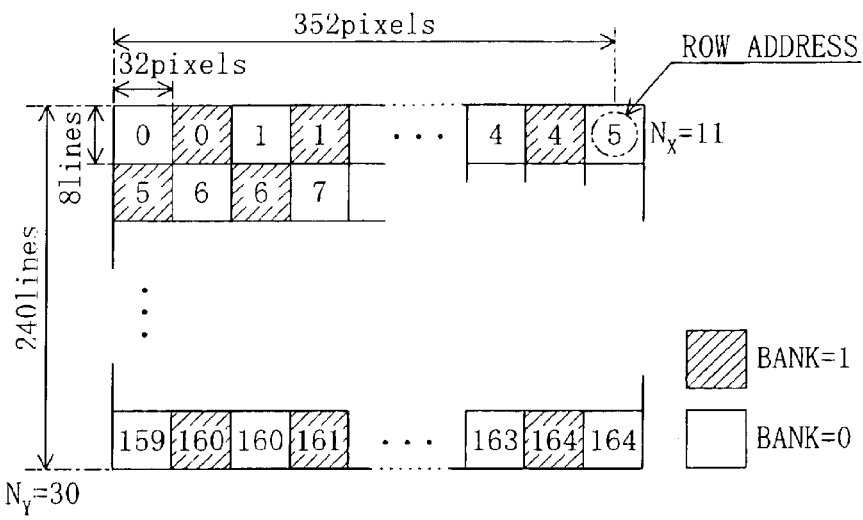
FIG. 23B
FIG. 23C
FIG. 23D
$$\text{RowAddress} = \frac{1}{2}\left(\frac{Y}{8} \times N_X + \frac{X}{32}\right)$$
$$\text{Bank} = \left(\frac{Y}{8} \times N_X + \frac{X}{32}\right) \% 2$$
$$\text{ColumnAddress} = (Y \% 8) \times 32 + X \% 32$$

FIG. 28

| BASE_ADDRESS | MODE_SWITCH | CP_SIZE |

DATA TRANSFER DEVICE AND METHOD

BACKGROUND OF THE INVENTION

The present invention relates to a data transfer device for transferring data between a system bus and a local memory.

FIG. 29 is a block diagram of a conventional data transfer device. The operation of the conventional data transfer device of FIG. 29 is briefly described as follows. Note that in the following description, it is assumed that the LSI denoted by the reference numeral 90 is a graphics processor. A local memory 20 includes a general region 21 and a frame buffer region 22. A host central processing unit (CPU) 1 transfers drawing commands to the general region 21 via an interface section 91. A drawing processor 94 reads drawing commands from the general region 21, executes drawing, and outputs the drawing results to the frame buffer region 22. A display processor 95 reads display data from the frame buffer region 22 and outputs the read display data to a monitor 81.

The host CPU 1 and the interface section 91 execute data processing using byte addresses. The drawing processor 94 and the display processor 95 execute pixel processing using X, Y coordinates. A SDRAM interface 96 has functions of generating addresses for the general region 21 and addresses for the frame buffer region 22. More specifically, the SDRAM interface 96 generates addresses basically in the order of byte addresses of the local memory 20 for the general region 21, and generates addresses in the order of raster scanning for the frame buffer region 22.

In the conventional data transfer device described above, therefore, the host CPU 1 transfers drawing commands to the general region 21 and leaves the entire drawing processing to the drawing processor 94. With recent improvement in the performance of the host CPU 1, however, it has become possible for the host CPU 1 to perform drawing processing in parallel with the drawing processing by the drawing processor 94, to improve the drawing performance and the drawing functions. In this parallel drawing, the host CPU 1 executes a program, performs drawing processing by defining an array corresponding to an X, Y coordinate system, and transfers pixel data obtained as a result of the processing to the frame buffer region 22.

During the data transfer to the frame buffer region 22, the host CPU 1 temporarily retains the generated pixel data in a first region of a main memory 2, and then transfers the data to a second region thereof, before transferring the data to the interface section 91. In the transfer of the data to the second region of the main memory 2, the host CPU 1 must generate an address for a position in the local memory 20 at which the pixel data is to be stored from the coordinates of the pixel data by executing a program or using a device driver and the like.

In the conventional data transfer device, therefore, the host CPU 1 must perform address conversion for data using the main memory 2 when it intends to transfer the data to the frame buffer region 22. This is a burden to the host CPU 1, and thus significantly deteriorates the system performance if the CPU performance has no room to spare. In addition, the number of cycles required for the address generation, which is performed between the host CPU 1 and the main memory 2 via a system bus, is several thousands of times as large as the number of cycles required for data transfer between the LSI 90 and the local memory 20 in some cases. This causes a problem of reducing the transfer rate.

SUMMARY OF THE INVENTION

An object of the present invention is providing a data transfer device capable of speeding up data transfer to/from a local memory involving address generation and thus improving the performance of the entire system.

The data transfer device of the present invention is a data transfer device for transferring data between a local memory and a system bus, the local memory having a frame buffer region for storing pixels at addresses associated with coordinates of the pixels and a general region occupying the remaining area of the local memory, the data transfer device including: an interface section for generating a transfer parameter for accessing one of the frame buffer region and the general region based on control data for controlling data transfer sent from the system bus and outputting the generated transfer parameter, in addition to transferring data to/from the system bus; and a data processor for generating an address of data to be transferred in the local memory according to the transfer parameter and transferring data to/from the local memory using the generated address, in addition to transferring data to/from the interface section.

With the above configuration, the CPU connected to the system bus or the like is no more required to generate transfer parameters by software. Therefore, high-speed data transfer is attained between the system bus and the frame buffer region of the local memory. In addition, the CPU or the like can easily access the frame buffer region.

The interface section preferably includes: a data buffer for storing data received from one of the system bus and the data processor, and outputting the data to the other; a control register for storing the control data; and a transfer parameter generator for generating the transfer parameter based on the control data stored in the control register and outputting the generated transfer parameter, the transfer parameter generator also controlling the data buffer.

With the above configuration, both in access to the general region and access to the frame buffer region, the transfer parameter generator generates a transfer parameter to enable DMA transfer of data between the system bus and the local memory. This improves the data transfer efficiency.

Preferably, the interface section further includes: an address information register for storing an address designating a position in the general region; and an address comparator for comparing the address stored in the address information register with an address designating an access destination sent from the system bus, and outputting the comparison result, wherein the transfer parameter generator generates a parameter for accessing the general region as the transfer parameter when the comparison result indicates that the address designating the access destination is an address in the general region, and outputs the generated parameter.

With the above configuration, the way of generation of a transfer parameter can be switched according to the address of the access destination. Therefore, the consistency of the format of data transferred can be maintained even when no sequentiality is kept between the timing of data transfer between the system bus and the general region and the timing of data transfer between the system bus and the frame buffer region.

Preferably, the address comparator compares a bit sequence having a predetermined length from the most significant bit of the address stored in the address information register with a bit sequence having the same length from the most significant bit of the address designating the access destination, and the transfer parameter generator regards the address designating the access destination as an address in the general region when the comparison result from the address comparator indicates that the compared two bit sequences match with each other.

With the above configuration, address comparison is facilitated.

Preferably, the length of the bit sequence for comparison is set in the address information register via the system bus, and the address comparator performs the comparison according to the length of the bit sequence set in the address information register.

With the above configuration, the size of the region used as the general region can be easily changed.

Preferably, the interface section comprises: a plurality of system data buffers for storing data transferred to/from the system bus; a plurality of system data buffer controllers provided for the respective system data buffers for controlling data input/output into/from the corresponding system data buffers; a plurality of control registers provided for the respective system data buffers for storing the control data for data stored in the corresponding system data buffers; a data transfer monitoring controller for selecting one of the plurality of system data buffers according to the states of the system data buffers, instructing the system data buffer controller for the selected system data buffer to use the system data buffer for data transfer, and outputting data indicating the selected system data buffer; a data buffer for receiving data from one of the selected system data buffer and the data processor, storing the received data, and outputting the stored data to the other; and a transfer parameter generator for generating the transfer parameter based on control data stored in the control register corresponding to the selected system data buffer and outputting the generated transfer parameter, and also controlling the data buffer.

With the above configuration, data transfer using a plurality of channels is possible, which can provide an effect resembling that attained by using a plurality of data transfer routes. In particular, since control information for data transfer can be set for each channel, it is possible to transfer data in different formats for different channels.

BRIEF DESCRIPTION OF THE DRAWINGS

FIG. 8 is an illustration of overhead occurring during drawing when a SDRAM is mapped as shown in FIG. 7.

FIG. 12A is an illustration of the widths of fields XB and YB of a byte address with respect to the width of an image to be transferred for 8 bits/pixel data. FIG. 12B is an illustration of the widths of fields XB and YB of a byte address with respect to the width of an image to be transferred for 16 bits/pixel data. FIG. 12C is an illustration of the widths of fields XB and YB of a byte address with respect to the width of an image to be transferred for 24 bits/pixel data.

FIG. 13 is an illustration of control data for data transfer stored in a control register.

FIG. 14 is an illustration of format information stored in the control register.

FIG. 18 is an illustration of the number of bits and the function for each field of the DMA transfer registers in FIGS. 17A to 17D.

FIG. 21A is an illustration of pixels stored in one word for 8 bits/pixel data. FIG. 21B is an illustration of a screen mapped to the frame buffer region together with row addresses for 8 bits/pixel data. FIG. 21C is an illustration of the numbers of pages in the horizontal and vertical directions and the number of bits in the frame buffer region required for storing one screen for 8 bits/pixel data. FIG. 21D shows expressions for calculating an address from X, Y coordinates on a screen in the case of data transfer to the frame buffer region for 8 bit/pixel data.

FIG. 22C is an illustration of the numbers of pages in the horizontal and vertical directions and the number of bits in the frame buffer region required for storing one screen for 16 bits/pixel data. FIG. 22D shows expressions for calculating an address from X, Y coordinates on a screen in the case of data transfer to the frame buffer region for 16 bit/pixel data.

FIG. 23A is an illustration of a pixel stored in one word for 24 bits/pixel data. FIG. 23B is an illustration of a screen mapped to the frame buffer region together with row addresses for 24 bits/pixel data. FIG. 23C is an illustration of the numbers of pages in the horizontal and vertical directions and the number of bits in the frame buffer region required for storing one screen for 24 bits/pixel data. FIG. 23D shows expressions for calculating an address from X, Y coordinates on a screen in the case of data transfer to the frame buffer region for 24 bit/pixel data.

FIG. 28 is an illustration of address information stored in an address information register.

DESCRIPTION OF THE PREFERRED EMBODIMENTS

Hereinafter, preferred embodiments of the present invention will be described with reference to the accompanying drawings. Note that one word consists of 32 bits in the following embodiments.

Embodiment 1

Figure 1:
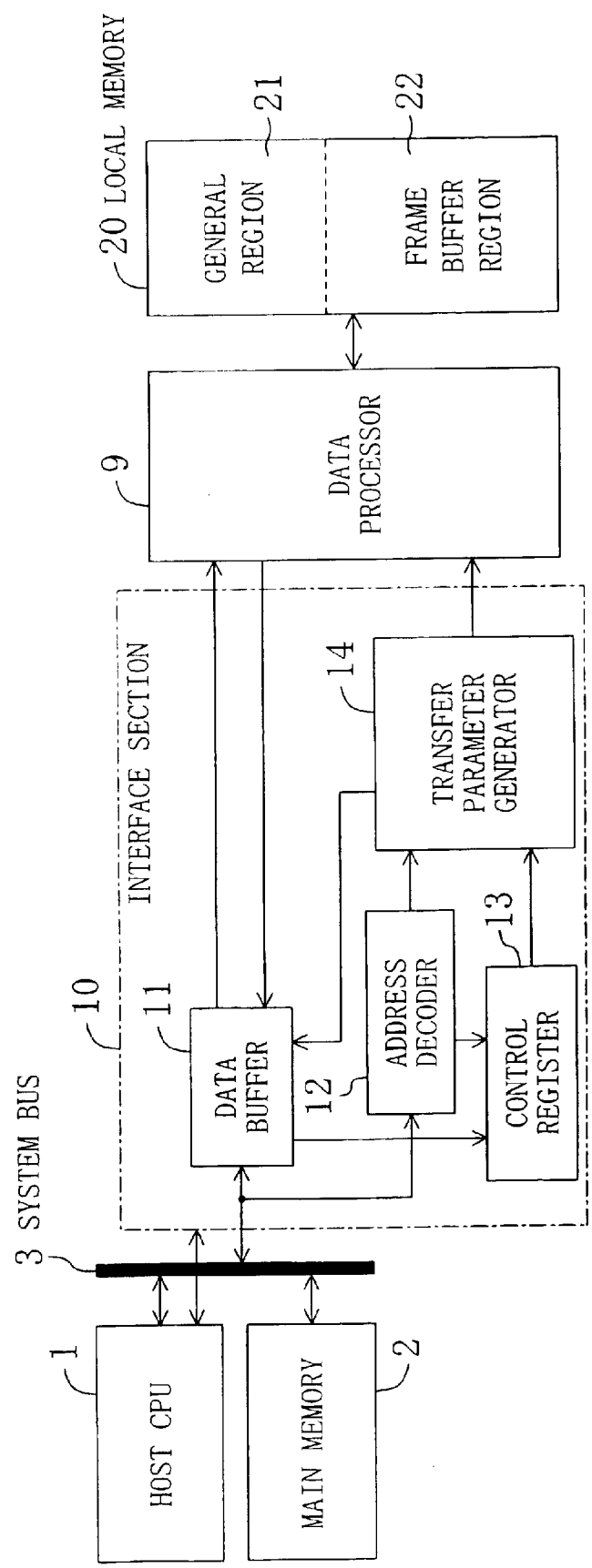
FIG. 1 is a block diagram of a data transfer device of Embodiment 1 of the present invention.

FIG. 1 is a block diagram of a data transfer device of Embodiment 1 of the present invention. The data transfer device of FIG. 1 includes an interface section 10 and a data processor 9. The data transfer device transfers data between a system bus 3 and a local memory 20. A host CPU 1 as a system bus master controls the system bus 3. A main memory 2 is connected to the system bus 3. The interface section 10 includes a data buffer 11, an address decoder 12, a control register 13 and a transfer parameter generator 14.

The local memory 20 may be a synchronous dynamic random access memory (SDRAM), for example. If so, the data processor 9 is a SDRAM interface. The local memory 20 includes a general region 21 and a frame buffer region 22, which are allocated on an address map by the host CPU 1. The general region 21, which corresponds to the area of the local memory 20 other than the frame buffer region 22, stores drawing commands and the like for the host CPU 1. The frame buffer region 22 stores image data, and the addressing thereof is different from that of the system bus 3. To state more specifically, in the frame buffer region 22, the two-dimensional coordinates representing a position of a pixel and the address at which the pixel is stored are associated with each other in a certain correspondence. For example, when two pixels are positioned side by side in succession on a two-dimensional coordinate system, the addresses in the frame buffer region 22 associated with these pixels are not necessarily positioned in succession.

Although not shown, the interface section 10 includes a controller for performing handshake with the host CPU 1. In response to a request for write or read access from the host CPU 1, the controller outputs a wait signal and the like according to whether or not data exists in the data buffer 11.

An example of data transfer between the host CPU 1 and the general region 21 of the local memory 20 will be described. During write access, or during data transfer to the general region 21, the host CPU 1 first retains a generated drawing command in the main memory 2 temporarily. The host CPU 1 then establishes write access to an address allocated in the general region 21 via the system bus 3 for transfer of the drawing command temporarily retained in the main memory 2.

The data buffer 11 receives the data from the main memory 2 via the system bus 3 and stores the data therein. The address decoder 12 receives the address sent from the host CPU 1 via the system bus 3, and decodes the address. The address decoder 12 determines whether the destination of transfer of the data stored in the data buffer 11 is the control register 13 or the local memory 20, and outputs the determination result to the transfer parameter generator 14.

If the destination of the data transfer is the control register 13, the control register 13 stores the data from the data buffer 11 as control data for controlling data transfer. If the destination of the data transfer is the local memory 20, the transfer parameter generator 14 generates transfer parameters for access to the general region 21 based on the control data from the control register 13, and outputs the transfer parameters to the data processor 9. The transfer parameter generator 14 also controls the data buffer 11 to output the data stored in the data buffer 11 to the data processor 9. The data processor 9 transfers the data from the data buffer 11 to the general region 21 using the transfer parameters.

During read access, the address of data to be read output from the host CPU 1 is sent to the address decoder 12 via the system bus 3. The address decoder 12 decodes the address, determines whether the source of the data transfer is the control register 13 or the local memory 20, and outputs the determination result to the transfer parameter generator 14.

In the case of data transfer from the local memory 20, the transfer parameter generator 14 generates transfer parameters for access to the general region 21 and outputs the transfer parameters to the data processor 9, based on control data from the control register 13. The data processor 9 reads the data from the general region 21 using the transfer parameters and sends the data to the data buffer 11. The transfer parameter generator 14 controls the data buffer 11 to store the data sent from the data processor 9 and output the data to the host CPU 1 via the system bus 3.

Next, data transfer between the host CPU 1 and the frame buffer region 22 of the local memory 20 will be described. The host CPU 1 executes processing for generating a drawing object desired to be displayed on a screen of a monitor (not shown) using the main memory 2. The drawing object is represented as a group of pixel data having X, Y coordinates. The host CPU 1 temporarily retains the generated pixel data in the main memory 2.

The host CPU 1 sets information indicating that the access is to the frame buffer region 22 and information indicating the frame number, the number of bits required for representing one pixel and the like, which are sent to the control register 13 via the system bus 3 and stored therein as control data. The transfer parameter generator 14 does not operate when the access destination is the control register 13.

Thus, the information for accessing to the frame buffer region 22 is preset in the control register 13. Thereafter, the transfer parameter generator 14 generates transfer parameters for accessing to the frame buffer region 22 using the control data stored in the control register 13, and outputs the transfer parameters to the data processor 9.

The host CPU 1 then starts data transfer from the main memory 2 to the frame buffer region 22. For both write access and read access, the data input/output between the data buffer 11 and the data processor 9 and the control sequence by the transfer parameter generator 14 are the same as those for the transfer between the general region 21 and the main memory 2 described above, except that the access is to the frame buffer region 22.

In any of the above cases, during data transfer between the data processor 9 and the local memory 20, the data processor 9 determines the address to be accessed in the local memory 20 according to the transfer parameters.

As described above, the transfer parameter generator 14 generates the transfer parameters according to the information stored in the control register 13, and in this way, the host CPU 1 can transfer data to and from either of the general region 21 and the frame buffer region 22.

How to store data in the general region 21 of the local memory 20 will be described.

The data processor 9, which stores data in the general region 21 in the order of addresses in the SDRAM, adopts address mapping taking advantage of a feature of SDRAM data accessing. In the following description, a region in one bank accessible with a same row address is called a page.

Figure 2:
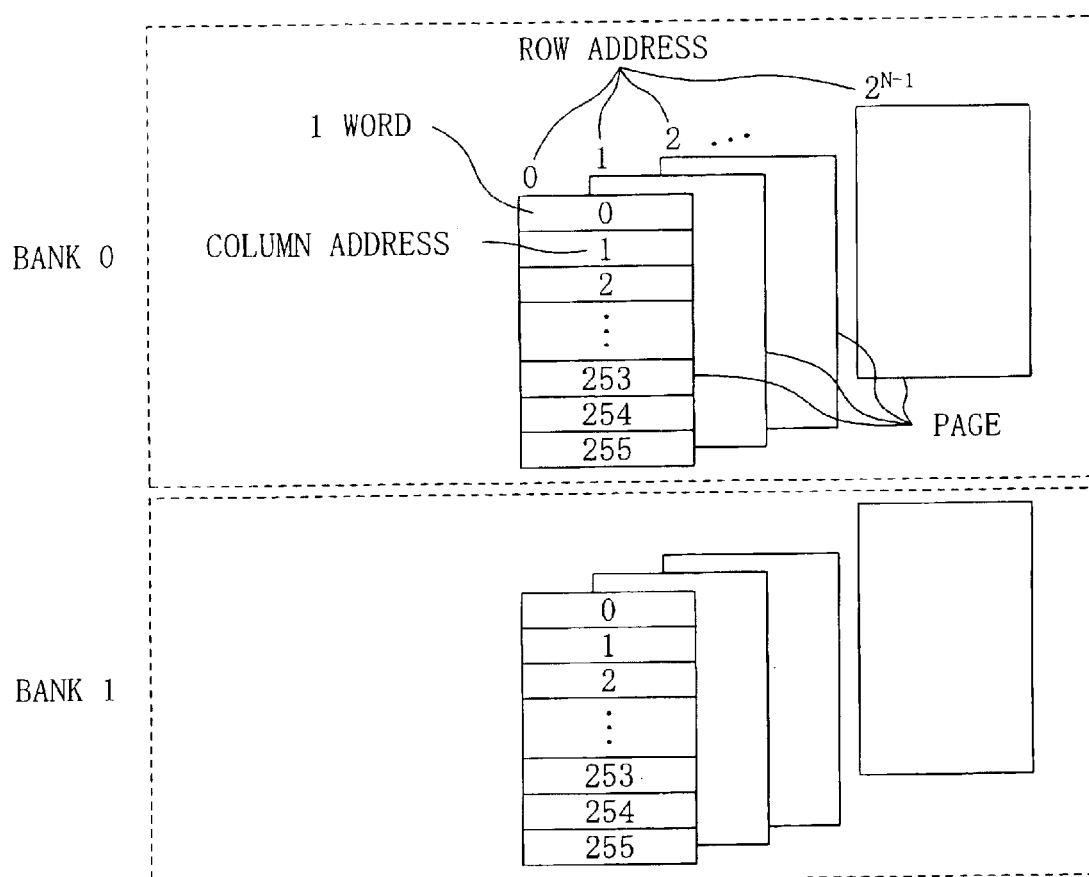
FIG. 2 is a diagrammatic view of a general SDRAM having two banks.
Figure 3A:
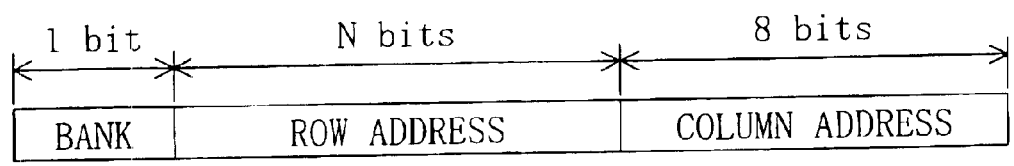
FIG. 3A is an illustration of the order of three types of addresses generally allocated in an address pin of a SDRAM.

FIG. 2 is a diagrammatic illustration of a general SDRAM having two banks, bank "0" and bank "1". The banks "0" and "1" respectively have $2^N$ pages to which row addresses "0" to "$2^N$-1" are allocated. Each page has a storage region of 256 words to which column addresses "0" to "255" are allocated. With this configuration, when a certain word is designated, three types of addresses, the bank, the row address, and the column address, must be specified. FIG. 3A illustrates the order of the three types of addresses normally allocated in an address pin of the SDRAM.

Figure 4:
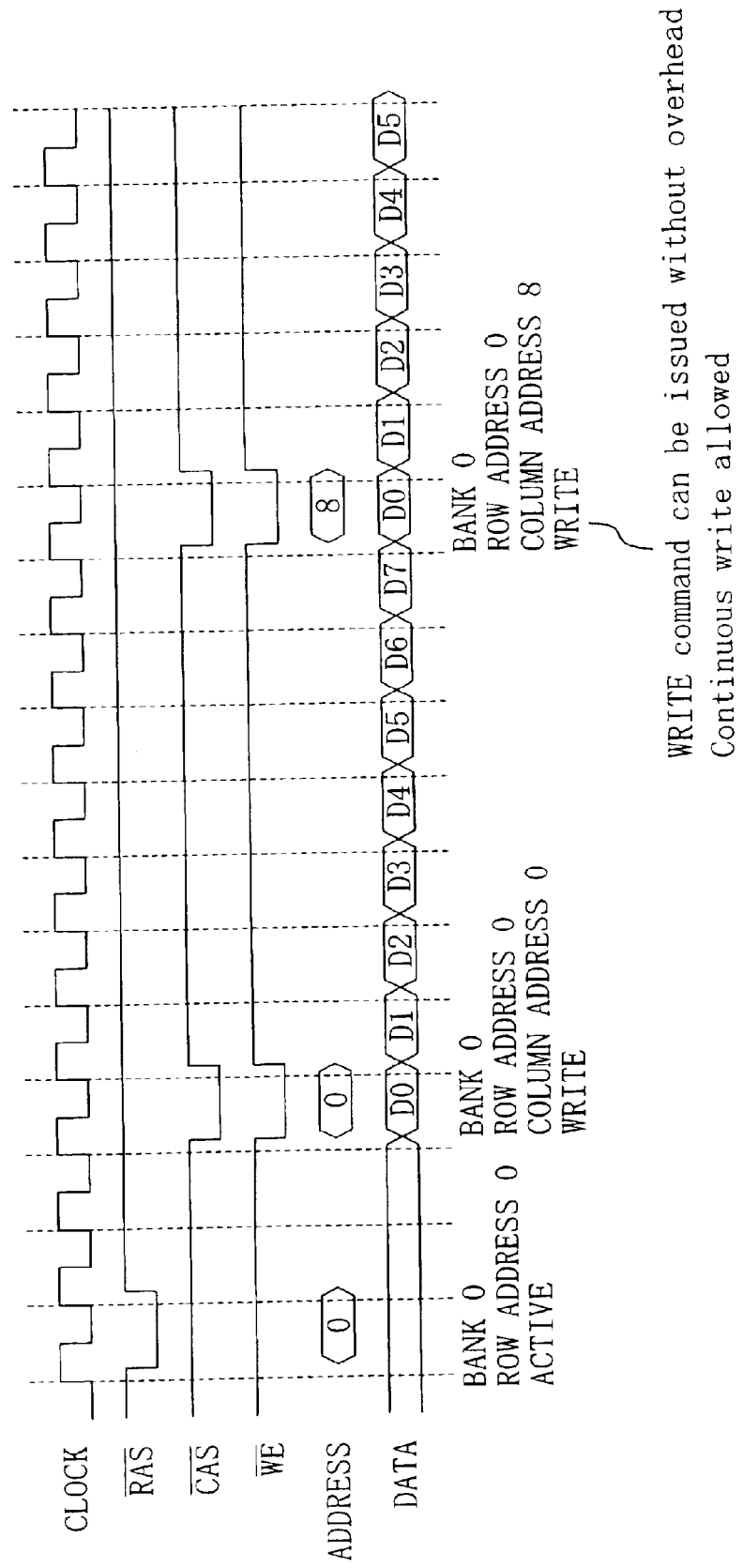
FIG. 4 is a timing chart of the operation of a SDRAM in the case of access to the same bank and the same row address as those in the preceding access.

Overhead sometimes occurs when a certain word in the SDRAM is accessed and subsequently another word is accessed. FIG. 4 is a timing chart of the operation of the SDRAM in the case that after access to a word, another word in the same bank at the same row address is accessed. Assume that the burst length is set at 8. To state specifically, FIG. 4 illustrates the case that after access to a word in bank "0" at row address "0" and column address "0", a word at column address "8" in the same bank at the same row address is accessed. In this case, no overhead occurs, and thus continuous access to other column addresses is possible.

Figure 5:
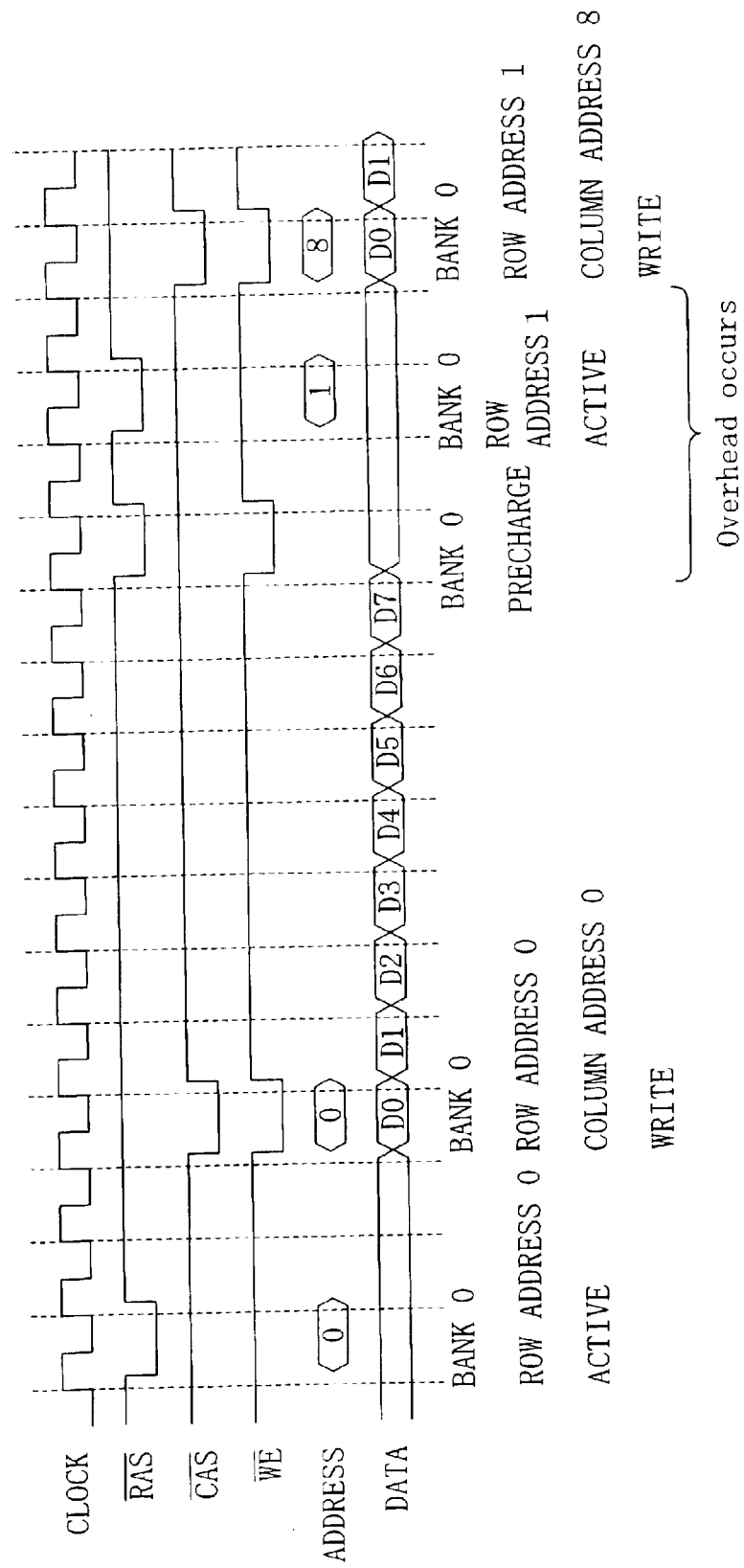
FIG. 5 is a timing chart of the operation of a SDRAM in the case of access to the same bank but a different row address from that in the preceding access.

FIG. 5 is a timing chart of the operation of the SDRAM in the case that after access to a word, another word in the same bank at a different row address is accessed. To state specifically, FIG. 5 illustrates the case that after access to a word in bank "0" at row address "0", a word at row address "1" in the same bank is accessed. In this case, a PRE-CHARGE command and an ACTIVE command must be inserted, and thus overhead occurs.

Figure 6:
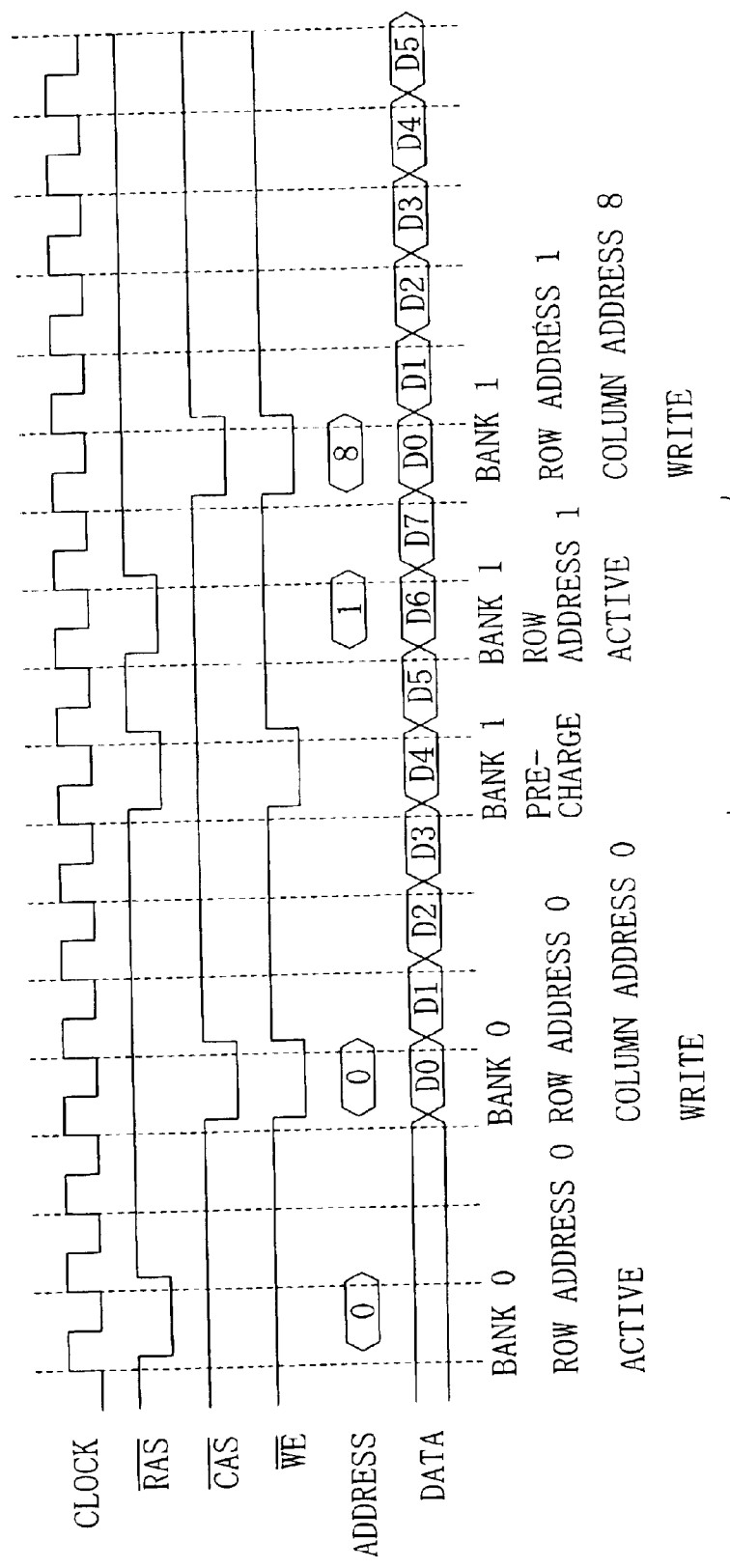
FIG. 6 is a timing chart of the operation of a SDRAM in the case of access to a different bank from that in the preceding access.

FIG. 6 is a timing chart of the operation of the SDRAM in the case that after access to a word, another word in a different bank is accessed. To state specifically, FIG. 6 illustrates the case that after access to a word in bank "0" at row address "0", a word in bank "1" at row address "1" is accessed. In this case, also, a PRECHARGE command and an ACTIVE command must be inserted. However, since the precharge command and the ACTIVE command for bank "1" can be executed during the access to bank "0", the insertion of the commands can be concealed. Therefore, virtually, no overhead occurs.

Figure 3B:
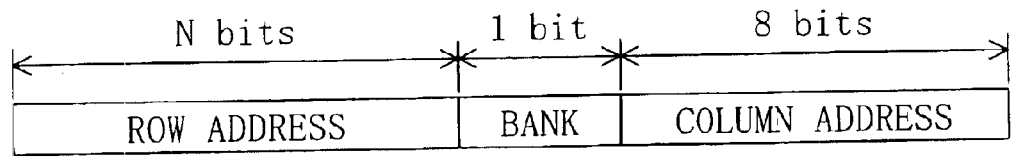
FIG. 3B is an illustration of a format of an address generated by a data processor.

FIG. 3B illustrates a format of an address generated by the data processor 9. As discussed above with reference to FIG. 5, overhead occurs in the case that after access to a word, another word in the same bank at a different row address is accessed. This means that in transfer of many words in succession, the transfer rate will be higher when the frequency of change of the row address is lower. In view of this, the data processor 9 outputs an address having a format as shown in FIG. 3B to the local memory 20 when data is to be stored in the general region 21.

In the format described above, the bit designating the bank is less significant than the bits designating the row address. Therefore, when the least significant bit of the integrated address composed of the row address, the bank and the column address is sequentially increased, the different banks are alternately accessed. This enables access in the order of addresses in the SDRAM without occurrence of overhead even if the number of words to be transferred is enormous. Although the case of two banks was described, substantially the same effect is obtained when the number of banks is 4 or more.

Next, how to store data in the frame buffer region 22 of the local memory 20 will be described. The host CPU 1 executes drawing and determines values representing pixels of a graphics image and the X, Y coordinates of the values.

Figure 7:
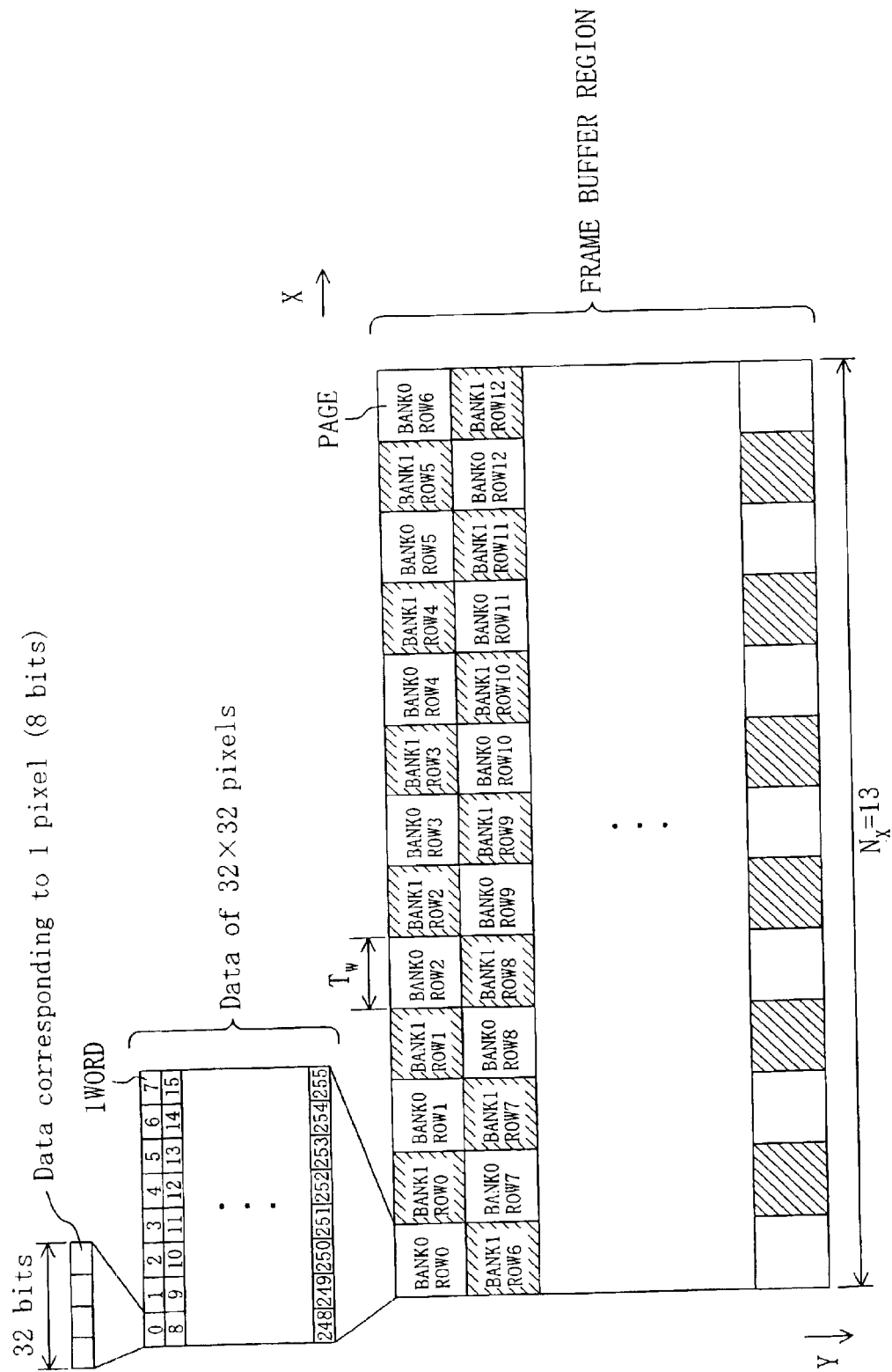
FIG. 7 is an illustration of address mapping in a frame buffer region.

FIG. 7 is an illustration of address mapping for the frame buffer region 22. Herein, assume that one word in the local memory 20 consists of 32 bits and one pixel consists of 8 bits. Since 256 words are stored in one page and four pixels are stored in one word, one page includes a rectangle of 32×32 pixels (1024 pixels).

The X, Y coordinates on the screen are mapped to addresses in the frame buffer region 22 as shown in FIG. 7. The width of the screen mapped to the frame buffer region 22 represented in units of 32 bits (Tw) is the number of pages in the horizontal direction $N_x$, which is set to be an odd number. In the example in FIG. 7, $N_x$=13. In FIG. 7, the hatched pages belong to bank "0" while non-hatched pages belong to bank "1". Thus, a rectangle in a certain page in one bank is immediately adjacent to a rectangle in a page belonging to a different bank. The number of pages in the horizontal direction $N_x$ may be an even number.

For 16 bits/pixel data, a rectangle of 32 (horizontal)×16 (vertical) pixels is stored in one page. For 24 bits/pixel, a rectangle of 32 (horizontal)×8 (vertical) pixels is stored in one page.

FIG. 8 illustrates occurrence of overhead during drawing with the SDRAM mapped as shown in FIG. 7. Referring to FIG. 8, overhead occurs when access is made over a plurality of pages continuously like drawing of lines L1 and L2, but no overhead occurs when access is made within one page like drawing of line L3. Therefore, this mapping is very effective particularly for drawing of a large number of short lines such as line L3 at random positions. Thus, by mapping as shown in FIG. 7, the probability of occurrence of overhead during drawing of a line is small.

Any adjacent rectangles are stored in pages belonging to different banks. Therefore, in drawing of polygon P1 in FIG. 8, for example, no overhead occurs even during accessing for filling-in of the polygon by increasing the X coordinate. In this way, a drawing processor (not shown) can transfer a large number of words in succession without occurrence of overhead by accessing the local memory 20 during execution of drawing of a line, filling-in of a polygon and the like. This improves the drawing performance.

Hereinafter, data transfer from the host CPU 1 to the frame buffer region 22 of the local memory 20 will be described in a concretive manner. In the following description, assume that the frame buffer region 22 can store data corresponding to 12 screens, and areas each storing data corresponding to one screen are called frame memories FM0 to FM11.

FIGS. 9A to 9D illustrate addresses of data transferred to the frame buffer region 22 by the host CPU 1 for 8 bits/pixel data. The data is transferred from the host CPU 1 to the frame buffer region 22 in units of one word (32 bits). Therefore, for 8 bits/pixel data, four pixels are handled together as one word, and the host CPU 1 allocates a byte address to each word.

Figure 9A:
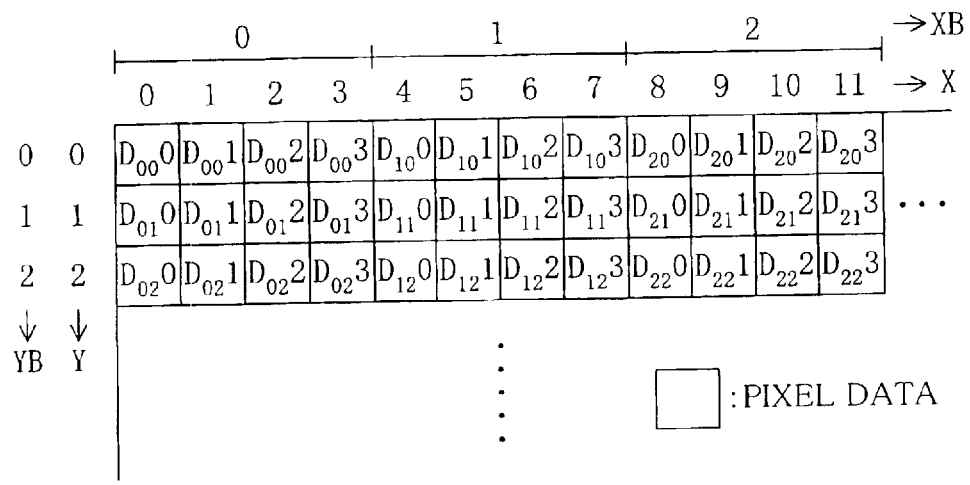
FIG. 9A is an illustration of the relationship between coordinates X, Y handled by a host CPU and word-unit coordinates XB, YB for 8 bits/pixel data.

FIG. 9A illustrates the relationship between the coordinates X and Y adopted by the host CPU 1 and the word-unit coordinates XB and YB. For example, among pixels having the same coordinate Y, those having a coordinate X of 0 to 3 are collectively handled as a word having a word-unit coordinate XB of 0, and those having a coordinate X of 4 to 7 are collectively handled as a word having a word-unit coordinate XB of 1. The word-unit coordinate YB is equal to the coordinate Y.

Figure 9B:
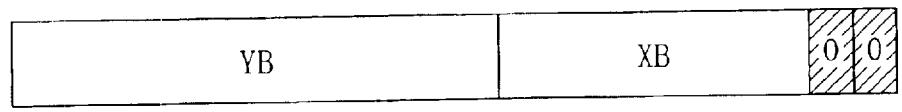
FIG. 9B is an illustration of a format of a byte address for 8 bits/pixel data.

FIG. 9B illustrates a format of a byte address for 8 bits/pixel data. The byte address includes field YB as more significant bits and field XB as less significant bits combined together. The field XB is made of the coordinate XB, and the field YB is made of the coordinate YB.

Figure 9C:
FIGS. 9C and 9D are illustrations of positions of four pixels stored in one word for 8 bits/pixel data.
Figure 9D:

FIGS. 9C and 9D illustrate the positions of four pixels stored in one word for 8 bits/pixel data. The subscripts x and y respectively denote the word-unit coordinates XB and YB. This also applies to the representation of each pixel in FIG. 9A. For example, $D_{10}3$ represents a pixel in a word having word-unit coordinates (XB, YB)=(1, 0) in which the coordinate X value is largest (that is, a pixel having a coordinate X of 7). Four pixels in a word are stored as shown in FIG. 9C when the host CPU 1 supports little endian, or stored as shown in FIG. 9D when the host CPU 1 supports big endian.

FIGS. 10A to 10D illustrate addresses of data transferred to the frame buffer region 22 by the host CPU 1 for 16 bits/pixel data. In the case of 16 bits/pixel data, two pixels are handled together as one word, and the host CPU 1 provides a byte address to each word. The other features are substantially the same as those in the case of 8 bits/pixel data.

Figure 10A:
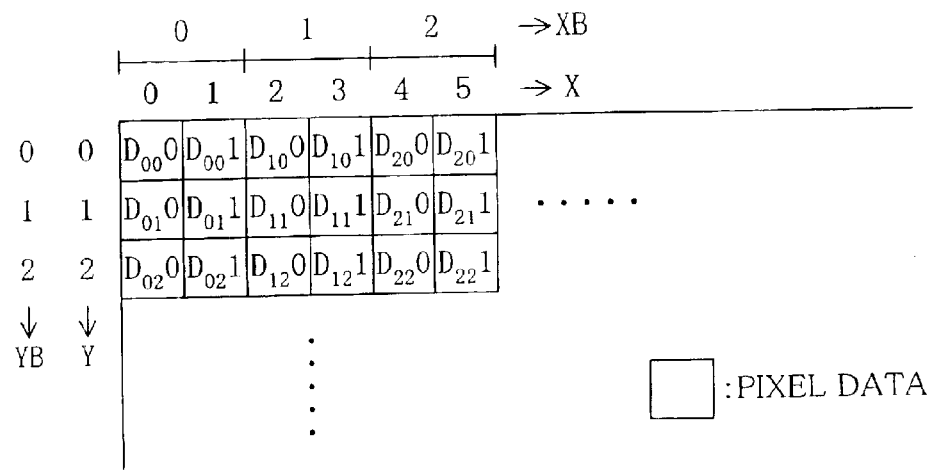
FIG. 10A is an illustration of the relationship between coordinates X, Y handled by the host CPU and word-unit coordinates XB, YB for 16 bits/pixel data.
Figure 10B:
FIG. 10B is an illustration of a format of a byte address for 16 bits/pixel data.
Figure 10C:
FIGS. 10C and 10D are illustrations of positions of two pixels stored in one word for 16 bits/pixel data.
Figure 10D:
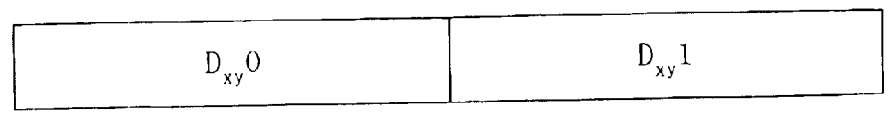

Specifically, FIG. 10A illustrates the relationship between the coordinates X and Y adopted by the host CPU 1 and the word-unit coordinates XB and YB. FIG. 10B illustrates a format of a byte address for 16 bits/pixel data. FIGS. 10C and 10D illustrate the positions of two pixels stored in one word for 16 bits/pixel data.

Figure 11A:
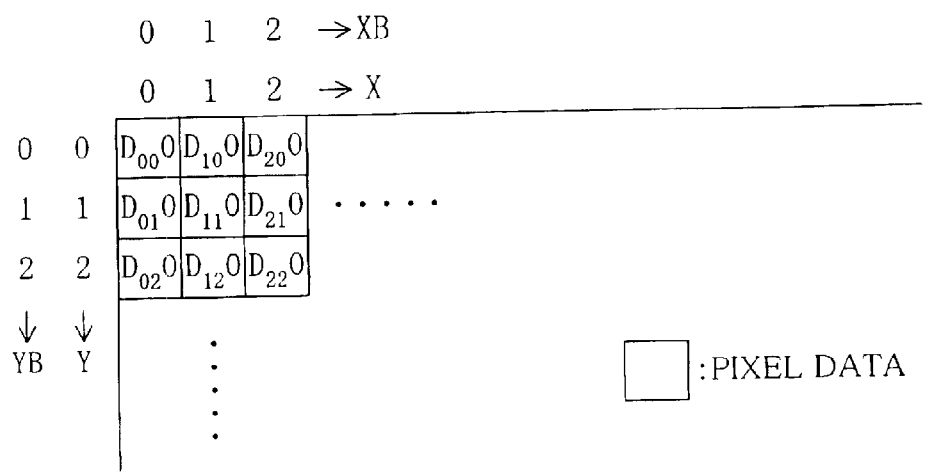
FIG. 11A is an illustration of the relationship between coordinates X, Y handled by the host CPU and word-unit coordinates XB, YB for 24 bits/pixel data.
Figure 11B:
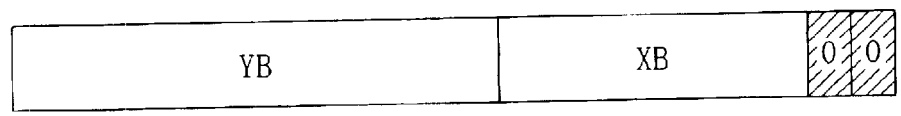
FIG. 11B is an illustration of a format of a byte address for 24 bits/pixel data.
Figure 11C:
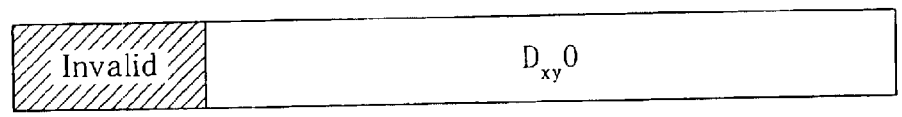
FIG. 11C is an illustration of a position of one pixel stored in one word for 24 bits/pixel data.

FIGS. 11A to 11C illustrate addresses of data transferred to the frame buffer region 22 by the host CPU 1 for 24 bits/pixel data. In the case of 24 bits/pixel data, one pixel is handled as one word, and the host CPU 1 provides a byte address for each word. The other features are substantially the same as those in the case of 8 bits/pixel data.

Specifically, FIG. 11A illustrates the relationship between the coordinates X and Y adopted by the host CPU 1 and the word-unit coordinates XB and YB. FIG. 11B illustrates a format of a byte address for 24 bits/pixel data. FIG. 11C illustrates the position of one pixel stored in one word for 24 bits/pixel data.

FIGS. 12A, 12B and 12C show the widths of fields XB and YB of each byte address with respect to the width of an image transferred in the cases of 8 bits/pixel data (see FIG. 9B), 16 bits/pixel data (see FIG. 10B) and 24 bits/pixel data (see FIG. 11B), respectively.

When transferring an image to the frame buffer region 22, the host CPU 1 sets a rectangular region including the image, and determines the pixel at the upper-left corner of the rectangular region as the pixel to be first transferred.

Assume that scanning is made for the rectangular region with the pixel to be first transferred as the start point in the following manner. That is, the coordinate X is sequentially increased from the smallest coordinate X (from the leftmost of the rectangular region) while the coordinate Y is fixed. Once the scanning reaches the rightmost pixel of the rectangular region, the coordinate Y is increased by one, and the above scanning of pixels is repeated from left to right. In this scanning, the host CPU 1 calculates the number of words to be transferred from the number of pixels required to be scanned until scanning of all the pixels of the image to be transferred is completed.

FIG. 13 illustrates control data for data transfer stored in the control register 13. The control data is sent to the control register 13 via the data buffer 11 and stored therein by the host CPU 1. As shown in FIG. 13, the control register 13 stores (a) a destination head address, (b) the number of words to be transferred, (c) a DMA start flag, and (d) format information at its addresses "0" to "3", respectively, as control data for direct memory access (DMA) transfer.

As the destination head address (DMA start address), the destination head address in the local memory 20 is stored in the case of data transfer to the general region 21. In the case of data transfer to the frame buffer region 22, the coordinates of a pixel to be first transferred are stored in the form of the byte address shown in FIG. 9B, 10B or 11B.

When the data destination is the general region 21, the transfer parameter generator 14 outputs the destination head address and the number of words to be transferred stored in the control register 13 to the data processor 9 as transfer parameters. When the data destination is the frame buffer region 22, the transfer parameter generator 14 performs address conversion for the destination head address and calculates the number of words to be transferred by referring to the format information, to prepare transfer parameters, and outputs the transfer parameters to the data processor 9.

The DMA start flag is set for start of DMA transfer. Once the host CPU 1 sets the DMA start flag, a controller (not shown) of the interface section 10 starts DMA transfer between the main memory 2 and the local memory 20.

FIG. 14 illustrates the format information stored in the control register 13. As shown in FIG. 14, the format information stored in the control register 13 includes fields FRAME_NO, X_WIDTH, RASTER_ON and PIXEL_TYPE.

The field FRAME_NO indicates the frame number to be accessed. The bit width of this field is 4 bits, for example, and the value and the frame number have the following relationship, for example.

| | |
|---|---|
| 0000: FM 0 | 0001: FM 1 |
| 0010: FM 2 | 0011: FM 3 |
| 0100: FM 4 | 0101: FM 5 |
| 0110: FM 6 | 0111: FM 7 |
| 1000: FM 8 | 1001: FM 9 |
| 1010: FM 10 | 1011: FM 11 |

The field X_WIDTH indicates the width of the field XB of the byte address used when the host CPU 1 accesses the local memory 20. The bit width of this field is 4 bits, for example, and the value and the width of the field XB have the following relationship, for example.

| | |
|---|---|
| 0000: 11 bits | 0001: 10 bits |
| 0010: 9 bits | 0011: 8 bits |
| 0100: 7 bits | 0101: 6 bits |
| 0110: 5 bits | |

The width of the field YB is obtained by reducing the width of the field XB from 32 bits.

The field RASTER_ON indicates which region of the local memory 20 the host CPU 1 accesses, the general region 21 or the frame buffer region 22. The bit width of this field is one bit, for example, and the value and the destination of data has the following relationship, for example.

0: access to the general region 21
1: access to the frame buffer region 22

The field PIXEL_TYPE indicates the number of bits per pixel (pixel type). The bit width of this field is 2 bits, for example, and the value and the number of bits per pixel has the following relationship, for example.

00: 24 bits/pixel
01: 16 bits/pixel
10: 8 bits/pixel

Figure 15A:
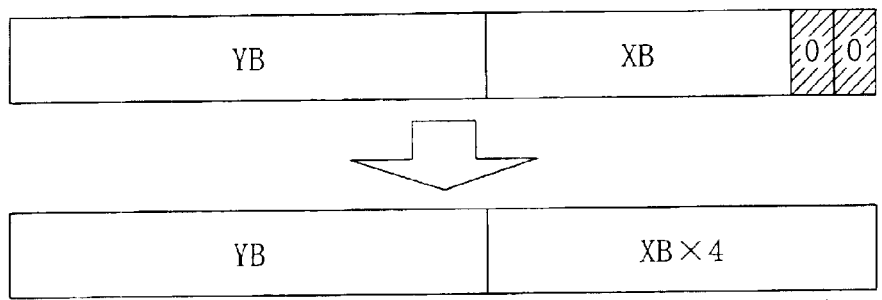
FIG. 15A is an illustration of change of a byte address to coordinates in a transfer parameter generator for 8 bits/pixel data.
Figure 15B:
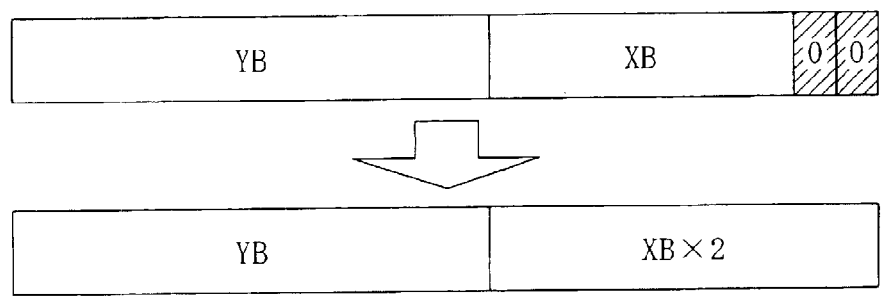
FIG. 15B is an illustration of change of a byte address to coordinates in a transfer parameter generator for 16 bits/pixel data.
Figure 15C:
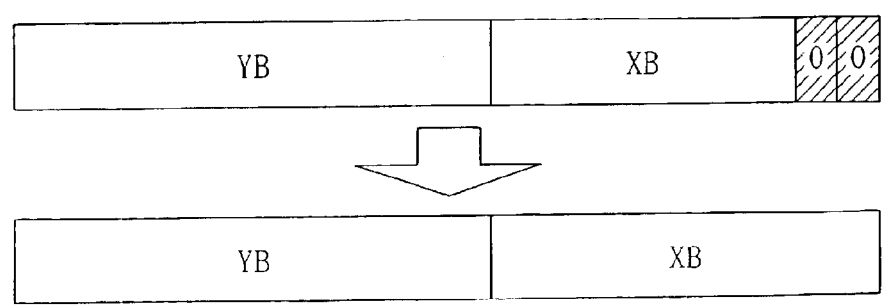
FIG. 15C is an illustration of change of a byte address to coordinates in a transfer parameter generator for 24 bits/pixel data.

FIGS. 15A, 15B and 15C illustrate conversion of a byte address to coordinates by the transfer parameter generator 14 for 8 bits/pixel data, 16 bits/pixel data and 24 bits/pixel data, respectively.

The transfer parameter generator 14 refers to the control register 13, converts a byte address to coordinates when the field RASTER_ON in FIG. 14 is "1" indicating that the host CPU 1 accesses the frame buffer region 22, to prepare transfer parameters, and outputs the prepared transfer parameters to the data processor 9.

To state specifically, as shown in FIGS. 15A to 15C, the transfer parameter generator 14 multiplies the value of the bits of the field XB of the byte address by four for 8 bits/pixel data and by two for 16 bits/pixel data, to obtain the coordinate X. For 24 bits/pixel data, the transfer parameter generator 14 uses the value of the bits of the field XB of the byte address as the coordinate X. In any of the above cases, the field YB is not changed and used as the coordinate Y as it is.

In addition, the transfer parameter generator 14 converts the number of words to be transferred to the number of pixels to be transferred. To state specifically, the transfer parameter generator 14 determines the number of pixels to be transferred for 8 bits/pixel data, 16 bits/pixel data and 24 bits/pixel data by multiplying the number of words to be transferred by four, two and one, respectively. The transfer parameter generator 14 outputs the coordinates X, Y and the number of pixels to be transferred obtained as described above to the data processor 9 as transfer parameters.

Figure 16:
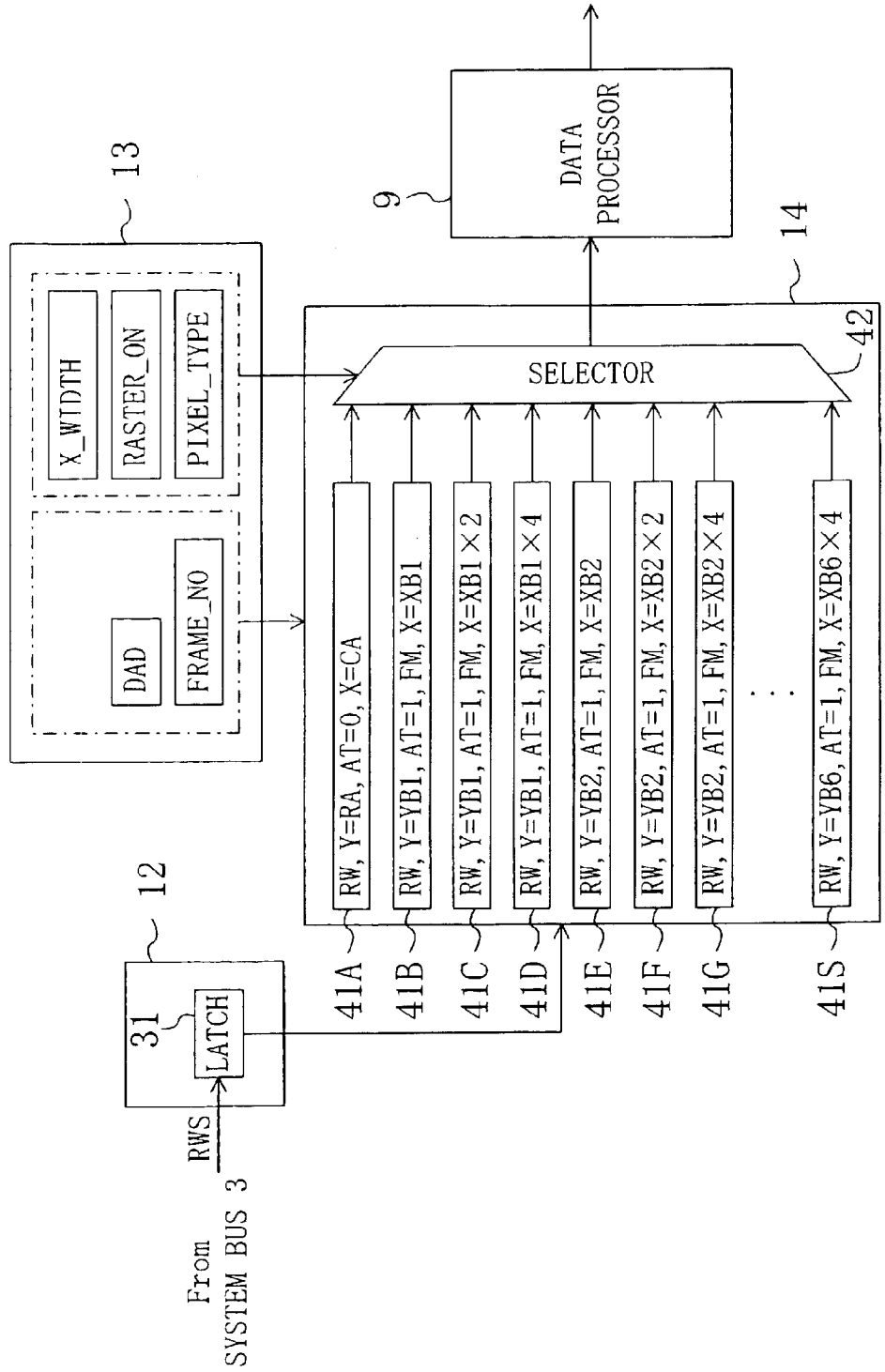
FIG. 16 is an illustration of an example of the transfer parameter generator in FIG.

FIG. 16 illustrates an example of the transfer parameter generator 14 in FIG. 1. Referring to FIG. 16, the address decoder 12 includes a latch 31, and the transfer parameter generator 14 includes a total of 19 registers 41A, 41B, 41C, . . . , 41S, for example, and a selector 42.

A read/write signal RWS, indicating read or write to be performed with the local memory 20, is input into the latch 31 from the host CPU 1 via the system bus 3. The latch 31 latches the signal to be output to the transfer parameter generator 14.

When control data is set in the control register 13, the transfer parameter generator 14 generates transfer parameters based on the value of the read/write signal RWS stored in the address decoder 12 and the control data stored in the control register 13, and stores the transfer parameters in the registers 41A to 41S.

The register 41A stores transfer parameters for the general region 21. That is, the register 41A stores the value RW of the read/write signal RWS, the row address RA of the destination head address DAD (upper bits of the address DAD), AT (=RASTER_ON)=0 indicating the general region 21, and the column address CA of the destination head address DAD (lower bits of the address DAD), as the transfer parameters.

The registers 41B to 41S store transfer parameters for the frame buffer region 22. For example, the register 41B stores transfer parameters for an image to be transferred having a horizontal width of 513 to 1024 pixels in the case of 24 bits/pixel. In other words, the register 41B stores the value RW of the read/write signal RWS, the Y coordinate YB1 of a pixel to be first transferred, AT=1 indicating the frame buffer region 22, the frame memory number FM (=FRAME_NO), and the X coordinate XB1 of the pixel to be first transferred, as the transfer parameters. The Y coordinate YB1 and the X coordinate XB1 are obtained by converting the destination head address DAD as discussed with reference to FIGS. 15A to 15C.

The registers 41C and 41D store transfer parameters for images to be transferred having a horizontal width of 513 to 1024 pixels in the cases of 16 bits/pixel and 8 bits/pixel, respectively. In other words, the registers 41C and 41D store XB1×2 and XB1×4, respectively, as the X coordinate. The remaining parameters are the same as those in the register 41B.

Likewise, the registers 41E, 41F and 41G store transfer parameters for images to be transferred having a horizontal width of 257 to 512 pixels. In the example shown in FIGS. 12A to 12C, there are defined six different ranges of horizontal widths of an image to be transferred for three different numbers of bits per pixel. Therefore, 6×3 sets of transfer parameters for access to the frame buffer region 22 are respectively stored in the registers 41B to 41S.

The selector 42 selects one of the outputs of the registers 41A to 41S according to the values of the fields X_WIDTH, RASTER_ON and PIXEL_TYPE of the format information stored in the control register 13, and outputs the result to the data processor 9. Although not shown in FIG. 16, the transfer parameter generator 14 outputs the number of words to be transferred to the data processor 9 when the field RASTER_ON of the format information is "0", and outputs the number of pixels to be transferred when it is "1", as a transfer parameter.

Thus, in the transfer parameter generator 14 shown in FIG. 16, since the transfer parameters have been calculated in advance, transfer parameters selected by the selector 42 can be promptly output to the data processor 9. Alternatively, the transfer parameter generator 14 may calculate and output only necessary transfer parameters.

Figure 17A:
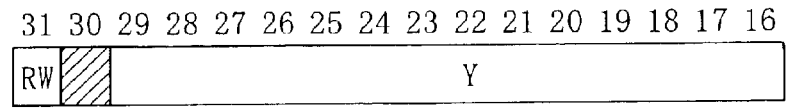
FIG. 17A is an illustration of a 32-bit register for designating the destination head address for write into a general region.
Figure 17B:
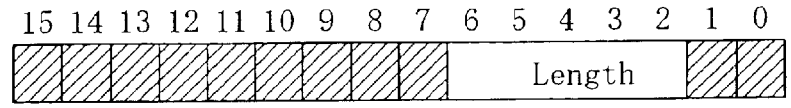
FIG. 17B is an illustration of a 16-bit register for designating the number of words to be transferred for write into the general region.
Figure 17C:
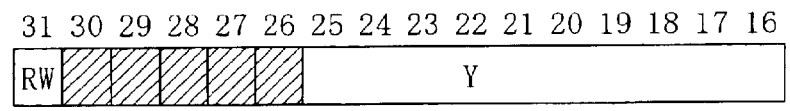
FIG. 17C is an illustration of a 32-bit register for designating the destination head address for write into a frame buffer region.
Figure 17D:
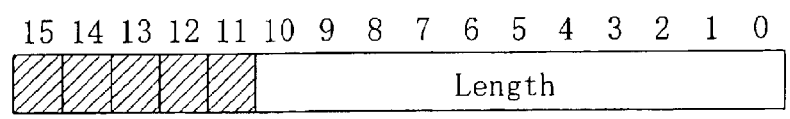
FIG. 17D is an illustration of a 16-bit register for designating the number of pixels to be transferred for write into the frame buffer region.

FIGS. 17A to 17D illustrate DMA transfer registers in the data processor 9. FIGS. 17A and 17B illustrate registers used for write into the general region 21, where FIG. 17A illustrates a 32-bit register for designating the destination head address and FIG. 17B illustrates a 16-bit register for designating the number of words to be transferred. FIGS. 17C and 17D illustrate registers used for write into the frame buffer region 22, where FIG. 17C illustrates a 32-bit register for designating the destination head address and FIG. 17D illustrates a 16-bit register for designating the number of pixels to be transferred. The transfer parameter generator 14 performs setting of fields of the DMA transfer registers of FIGS. 17A to 17D.

FIG. 18 shows the number of bits and the function for each field of the DMA transfer registers of FIGS. 17A to 17D. Field AT stores the value of the field RASTER_ON in FIG. 14, indicating which is the designation of data, the general region 21 or the frame buffer region 22. Field RW indicates which DMA transfer, write or read, is to be performed. For example, the value of the field RW is set at "0" for write into the local memory 20, while it is set at "1" for read from the local memory 20.

When the destination of data is the general region 21, the column address and the row address of the destination head address DAD are set in fields X and Y, respectively, as the DMA start address, and field Length includes the number of words to be DMA-transferred.

When the destination of data is the frame buffer region 22, the value of the field FRAME_NO in FIG. 14 is set in field FM, to set the frame memory of the destination of data. In fields X and Y, the coordinates of the pixel to be first transferred, obtained from the destination head address in the control register 13, are set as the DMA start address. In field Length, the number of pixels to be DMA-transferred, obtained from the number of words to be transferred in the control register 13, is set.

The transfer parameters are desirably stored in the format shown in FIG. 17A for the register 41A of the transfer parameter generator 14 shown in FIG. 16, and in the format shown in FIG. 17C for the registers 41B to 41S. By adopting these formats, the data processor 9 can store the output of the transfer parameter generator 14 in the DMA transfer register as it is.

Alternatively, the transfer parameter generator 14 may not be provided with the registers 41A to 41S, but may sort the read/write signal RWS output from the address decoder 12 and signals indicating the control data stored in the control register 13, or input these signals into a given logic circuit, so that the bit sequence of the resultant signals represents the transfer parameters. In this case, bit sequences corresponding to the registers 41A to 41S must be prepared in the format shown in FIG. 17A or 17C and be ready for simultaneous supply to the selector 42.

Figures 19, 20:
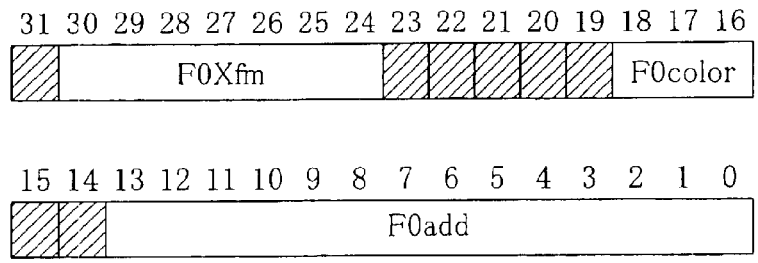
FIG. 19 is an illustration of a frame memory register of a data processor.
FIG. 20 is an illustration of the number of bits and the function for each field of the frame memory register in FIG. 19.

FIG. 19 illustrates a frame memory register in the data processor 9. As an example, a frame memory register for the frame memory FM0 is shown in FIG. 19. The data processor 9 includes frame memory registers such as that shown in FIG. 19 for the respective frame memories FM0 to FM11.

FIG. 20 shows the number of bits and the function for each field of the frame memory register shown in FIG. 19. This also applies to the frame memory registers for the respective frame memories FM1 to FM11.

Field F0add includes the base address of the frame memory FM0, which is a row address at which the pixel at the origin of the coordinate system of the frame memory FM0 is stored. Field F0color includes the number of bits per pixel. Field F0Xfm includes the number of pages $N_x$ in the horizontal direction discussed with reference to FIG. 7, as the size of the screen in the horizontal direction stored in the frame memory. This value is obtained by dividing the number of pixels in the horizontal direction of the screen actually displayed by 32, for example, rounding up the resultant value to obtain an integer, and adding one to the resultant integer if the integer is an even number, to obtain an odd number.

The host CPU 1 presets values for the fields F0add, F0color and F0Xfm of the frame memory register via a system address bus (not shown).

FIGS. 21A to 21D illustrate storage of data in the frame buffer region 22 for 8 bits/pixel data. FIG. 21A illustrates pixels stored in one word for 8 bits/pixel data. In the illustrated example, four pixels having a coordinate X of 4n to 4n+3 (n is an integer) and the same coordinate Y are stored as one word.

FIG. 21B illustrates a screen mapped to the frame buffer region 22 with row addresses for 8 bits/pixel data. In the illustrated example, the screen displayed has a size of 640 pixels×480 lines. Assume that the local memory 20 has two banks, and data in a rectangle of 32 pixels×32 lines is stored in one page (a memory region designated by a same row address in a same bank). In FIG. 21B, the number in each rectangle denotes the row address. To make up the screen displayed having a horizontal width of 640 pixels, a total of 20 such rectangles may be placed in a line in the horizontal direction. Note however that as discussed with reference to FIG. 7, since the number of rectangles in the horizontal direction should be odd to ensure that data in adjacent rectangles are stored in different banks, the number of rectangles is set at 21 (that is, the number of pages in the horizontal direction $N_X$=21). In the vertical direction, a total of 15 (480/32) rectangles are placed in a line (that is, the number of pages in the vertical direction $N_Y$=15).

FIG. 21C illustrates the numbers of pages in the horizontal and vertical directions $N_X$ and $N_Y$, and the number of bits in the frame buffer region 22 required for storing one screen for 8 bits/pixel data. FIG. 21D shows expressions for calculating the row address, the column address and the bank from the X, Y coordinates on the screen in the case of data transfer to the frame buffer region 22 for 8 bits/pixel data. In the calculation, the fractional portion of a quotient from division is discarded, and % denotes an operation of calculating a remainder by division.

Figure 22A:
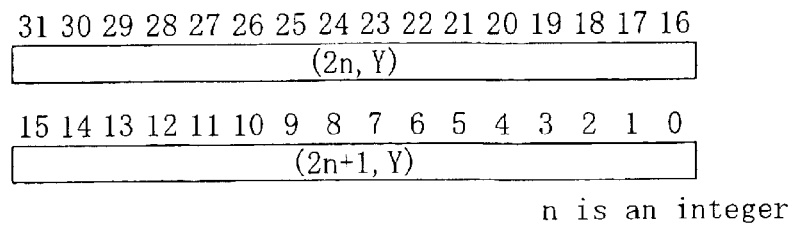
FIG. 22A is an illustration of pixels stored in one word for 16 bits/pixel data.
Figure 22B:
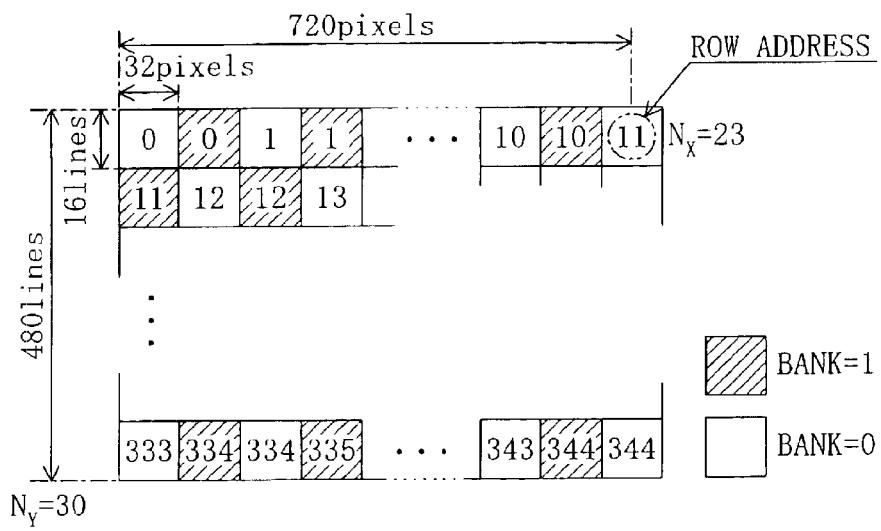
FIG. 22B is an illustration of a screen mapped to the frame buffer region together with row addresses for 16 bits/pixel data.

FIGS. 22A to 22D illustrate storage of data in the frame buffer region 22 for 16 bits/pixel data. FIG. 22A illustrates pixels stored in one word for 16 bits/pixel data. In the illustrated example, two pixels having a coordinate X of 2n and 2n+1 (n is an integer) and the same coordinate Y are stored as one word. FIG. 22B illustrates a screen mapped to the frame buffer region 22 with row addresses for 16 bits/pixel data. In the illustrated example, the local memory 20 stores data in a rectangle of 32 pixels×16 lines in one page.

FIG. 22C illustrates the numbers of pages in the horizontal and vertical directions $N_X$ and $N_Y$, and the number of bits in the frame buffer region 22 required for storing one screen for 16 bits/pixel data. FIG. 22D shows expressions for calculating the addresses from the X, Y coordinates on the screen in the case of data transfer to the frame buffer region 22 for 16 bits/pixel data. The values in FIG. 22C and the expressions in FIG. 22D are different from those in FIGS. 21C and 21D for 8 bits/pixel data.

FIGS. 23A to 23D illustrate storage of data in the frame buffer region 22 for 24 bits/pixel data. FIG. 23A illustrates a pixel stored in one word in the case of 24 bits/pixel data. In the illustrated example, data of RGB colors of one pixel are stored as one word. FIG. 23B illustrates a screen mapped to the frame buffer region 22 with row addresses for 24 bits/pixel data. In the illustrated example, the local memory 20 stores data in a rectangle of 32 pixels×8 lines in one page.

FIG. 23C illustrates the numbers of pages in the horizontal and vertical directions $N_X$ and $N_Y$, and the number of bits in the frame buffer region 22 required for storing one screen for 24 bits/pixel data. FIG. 23D shows expressions for calculating the addresses from the X, Y coordinates on the screen in the case of data transfer to the frame buffer region 22 for 24 bits/pixel data. The values in FIG. 23C and the expressions in FIG. 23D are different from those in FIGS. 21C and 21D for 8 bits/pixel data.

The data processor 9 refers to the DMA transfer registers in FIGS. 17C and 17D and the frame memory register (see FIG. 19, for example) corresponding to the frame memory designated in the field FM of the DMA transfer register in FIG. 17C. The data processor 9 then calculates the bank, the row address and the column address from the expressions in any of FIGS. 21D, 22D and 23D, adds the base address (for example, the value of the field F0add) of the frame memory register to the row address, to determine the address of the data transfer destination.

The data processor 9 determines a rectangular region set by the host CPU 1 to include an image to be transferred to the frame buffer region 22, from the horizontal width of the rectangular region and the coordinates of the pixel to be first transferred. The data processor 9 transfers data of pixels in the rectangular region to the frame buffer region 22 in units of a word by increasing the coordinate X sequentially starting from the coordinate X of the pixel to be first transferred (from the left end of the rectangular region) with the coordinate Y of the pixel being fixed. Once data of the pixel at the right end of the rectangular region has been transferred, the coordinate Y is increased by one, and the sequential transfer of data of pixels from the left end to the right end is repeated until the preset number of words has been transferred.

Specific examples of parameters will be described. Assume that the pixel type is 8 bits/pixel, the horizontal width of a rectangular region preset to include an image to be transferred to the frame buffer region 22 is 64 pixels, and the host CPU 1 executes drawing at coordinates (X, Y)=(32, 1). Note that the suffix "b" to a value denotes that the value is in binary representation.

Since the word-unit coordinates (XB, YB) of the above transfer data are (8, 1), the host CPU 1 sets the fields of a byte address as shown in FIG. 9B for this transfer data as follows.
 YB: 00 0000 0001b
 XB: 1000b
Assume also that the data transfer destination is the frame memory FM0. The width of the field XB is 6 bits with reference to FIG. 12A and the like. Since write into the frame buffer region 22 is performed and the pixel type is 8 bits/pixel, the host CPU 1 sets the following for the fields of the format information in FIG. 14.
 FRAME_NO: 0000b
 X_WIDTH: 0101b
 RESTER_ON: 1b
 PIXEL_TYPE: 10b The transfer parameter generator 14 converts the byte address to coordinates as described with reference to FIG. 15A, to generate
 Y: 00 0000 0001b
 X: 000 0010 0000b
 Length: 0000 0000 0000 0100b
as transfer parameters and outputs the transfer parameters to the data processor 9.

The data processor 9 sets
 0000 0000 0000 0001 1000 0000 0010 0000b
for the 32-bit DMA transfer register (see FIG. 17C) for designating the head address of the data destination. In this setting, since data is written into the frame memory FM0 of the frame buffer region 22, RW=0, AT=1, and FM=0000. Also, the data processor 9 sets
 0000 0000 0000 0100b
for the 16-bit DMA transfer register (see FIG. 17D) for designating the number of pixels to be transferred based on the value of the field Length.

Based on the values in the above DMA transfer registers, the data processor 9 calculates the row address, the column address and the bank from the expressions in FIG. 21D. The data processor 9 then adds the preset base address (0008, for example) of the frame memory FM0 to the calculated row address, to determine the destination head address in the local memory 20. That is, the following are determined.
 Row address: 0008
 Column address: 08
 Bank: 1

Substantially the same procedure is followed when data of a number of pixels is transferred, for example, when 20 words (80 pixels) are transferred with a pixel at coordinates (X, Y)=(32, 1) as the pixel to be first transferred. In this case, the transfer parameter generator 14 sets Length=101 0000b, and the data processor 9 sets 0000 0000 0101 0000b for the 16-bit DMA transfer register.

The above description is also applicable to the pixel types of 16 bits/pixel and 24 bits/pixel, although the description for these types is omitted here.

The data transfer from the host CPU 1 to the frame buffer region 22 of the local memory 20 was described. Reverse data transfer from the frame buffer region 22 to the host CPU 1 is also possible in a manner similar to that described above.

As described above, in the data transfer device of FIG. 1, the transfer parameter generator 14 generates transfer parameters. Therefore, the data transfer rate is high compared with implementation by software by the host CPU 1. In addition, the host CPU 1 can write operation results into the frame buffer region 22 and read data from the frame buffer region 22.

A first-in, first-out (FIFO) buffer may be used as the data buffer 11.

In the above description, 256 words (1024 pixels for 8 bits/pixel data) are stored in one page, and the page changes every 32 pixels in the X direction. Alternatively, values other than those described in this embodiment may be adopted for the capacity of each page and the relationship between the coordinates on a screen and the address in the local memory 20 at which a pixel at the coordinates is stored.

Embodiment 2

Figure 24:
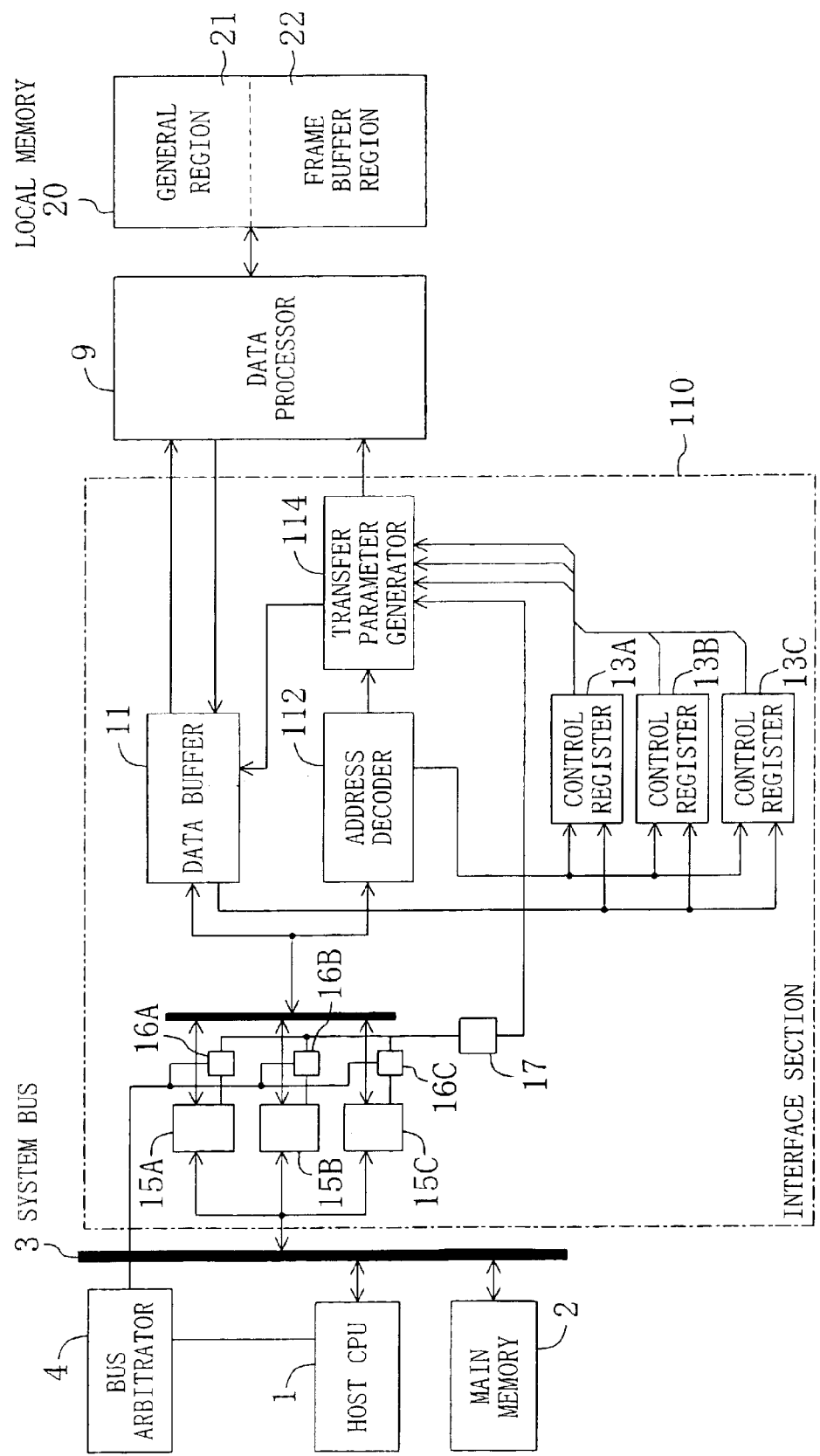
FIG. 24 is a block diagram of a data transfer device of Embodiment 2 of the present invention.

FIG. 24 is a block diagram of a data transfer device of Embodiment 2 of the present invention. The data transfer device of FIG. 24 includes an interface section 110 in place of the interface section 10 of the data transfer device of FIG. 1. A bus arbitrator 4 manages a system bus 3. Thus, the data transfer device of FIG. 24 can realize data transfer with a plurality of channels.

The interface section 110 includes a data buffer 11, an address decoder 112, control registers 13A, 13B and 13C, a transfer parameter generator 114, system data buffers 15A, 15B and 15C, system data buffer controllers 16A, 16B and 16C, and a data transfer monitoring controller 17.

Once being activated by the host CPU 1, the system data buffer controller 16A works as a bus master for the system bus 3 to control data transfer from a main memory 2 to the system data buffer 15A via the system bus 3. Likewise, once being activated by the host CPU 1, the system data buffer controllers 16B and 16C work as a bus master for the system bus 3 to control data transfer from the main memory 2 to the system data buffers 15B and 15C, respectively, via the system bus 3.

Thus, the system data buffers 15A, 15B and 15C respectively correspond to the system data buffer controllers 16A, 16B and 16C. The control registers 13A, 13B and 13C, which respectively correspond to the system data buffers 15A, 15B and 15C, store control data for data transfer involving the corresponding system data buffers. Since the control data can be set for each channel, data in different formats can be transferred for different channels.

The address decoder 112 decodes a received address, determines which is the transfer destination of data stored in the data buffer 11, any of the control registers 13A, 13B and 13C or the local memory 20, and outputs the determination result to the transfer parameter generator 114. When the destination is any of the control registers 13A, 13B and 13C, the address decoder 112 transfers the data in the data buffer 11 to the control register in question according to the determination result. The control registers 13A, 13B and 13C, which respectively correspond to the system data buffers 15A, 15B and 15C, output information for access to the local memory 20, set individually, to the transfer parameter generator 114.

The data transfer monitoring controller 17 makes contact with the system data buffer controllers 16A, 16B and 16C, to examine which one of the system data buffers 15A, 15B and 15C currently stores data. The data transfer monitoring controller 17 selects a system data buffer to be used for data transfer among the system data buffers 15A, 15B and 15C, and notifies the transfer parameter generator 114 of the selection result. According to the notification from the data transfer monitoring controller 17, the transfer parameter generator 114 selects control data output from one of the control registers 13A, 13B and 13C corresponding to the selected system data buffer, generates transfer parameters, and outputs the transfer parameters to a data processor (SDRAM interface) 9.

The selected system data buffer 15A, 15B or 15C outputs stored data to the data processor 9 via the data buffer 11. The data processor 9 writes data into the local memory 20 according to the transfer parameters.

The data transfer monitoring controller 17 also monitors whether or not data in any of the system data buffers 15A, 15B and 15C has been written into the local memory 20. In addition, the data transfer monitoring controller 17 protects the system data buffers 15A, 15B and 15C from having data written therein from the host CPU 1 and the main memory 2 when pre-transferred data is stored in the system data buffers.

Hereinafter, write of data into the local memory 20 via the system data buffer 15A will be described. First, the host CPU 1 activates the system data buffer controller 16A. The system data buffer controller 16A requests the bus arbitrator 4 to permit use of the system bus 3, and upon receipt of permission of bus access, transfers data from the main memory 2 to the system data buffer 15A.

The system data buffer controller 16A controls transfer of the data from the system data buffer 15A to the data buffer 11. The data transfer monitoring controller 17 notifies the transfer parameter generator 114 that control data stored in the control register 13A should be referred to.

The subsequent operation is substantially the same as that of the data transfer device of FIG. 1, and thus description thereof is omitted. The above description also applies to the system data buffers 15B and 15C. The host CPU 1 can transfer data using any of the system data buffers 15A, 15B and 15C which happens to be vacant. Thus, the host CPU 1 can start new data transfer with any of the system data buffers 15A, 15B and 15C even during data transfer by the data processor 9 and the like.

From the standpoint of the host CPU 1, the above operation is as if access to the local memory 20 is available via a plurality of channels. The host CPU 1 can instruct both read from and write into the local memory 20 in parallel. Thus, the data transfer device of FIG. 24 can improve the efficiency of data transfer without increasing the hardware scale so greatly, providing an effect resembling the effect attained by a device provided with 3-channel data transfer routes.

The data transfer from the host CPU 1 to the frame buffer region 22 of the local memory 20 was described. Reverse data transfer from the frame buffer region 22 to the host CPU 1 is also possible.

The data transfer device of this embodiment includes three control registers, three system data buffers and three system data buffer controllers to attain 3-channel data transfer. However, the number of channels is not limited to three.

In the above embodiments, the local memory 20 is a SDRAM. However, it may be a memory of any other type. In the case of using a memory of another type, the data processor 9 may be replaced with an interface suitable for the memory used.

Embodiment 3

In the data transfer device described in Embodiment 1, the host CPU 1 may set format information in the control register 13 for data transfer between the system bus 3 and the frame buffer region 22, and after this setting, the host CPU 1 may intend to transfer data between the system bus 3 and the general region 21. In such a case, the host CPU 1 must change the setting in the control register 13. In consideration of this, it is necessary to keep sequentiality between the timing of data transfer between the system bus 3 and the general region 21 and the timing of data transfer between the system bus 3 and the frame buffer region 22.

However, in a system permitting operation of a plurality of applications on the operating system (OS) basis, the above sequentiality is not necessarily ensured. Therefore, if data transfer to the general region 21 is performed after setting of format information in the control register 13 for data transfer to the frame buffer region 22, for example, the interface section 10 may deal with the data transfer to the general region 21 as data transfer to the frame buffer region 22. This damages the consistency of the data format.

Figure 25:
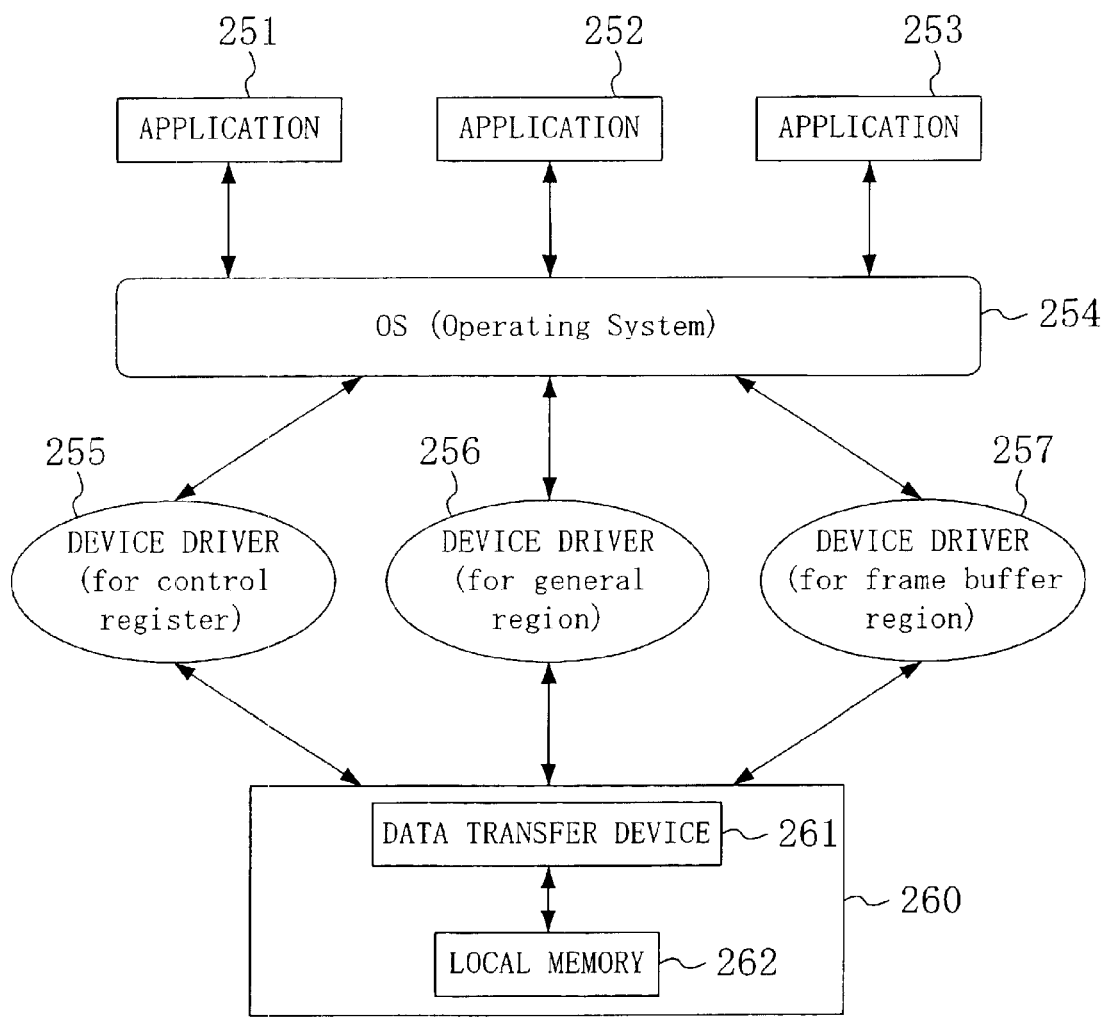
FIG. 25 is an illustration of a system including a plurality of applications operating on an OS.

The above problem will be described in detail. FIG. 25 illustrates a system permitting operation of a plurality of applications on an OS. In FIG. 25, a data transfer device 261 corresponds to a data transfer device including the data processor 9 and the interface section 10 in FIG. 1, and a local memory 262 corresponds to the local memory 20 in FIG. 1. The data transfer device 261 and the local memory 262 constitute hardware 260. The data transfer device 261 operates as an interface between an OS 254 and the local memory 262.

Applications 251, 252 and 253 operate in parallel with one another on the OS 254. The OS 254 issues a request for data transfer to one of device drivers 255, 256 and 257 selected based on which destination in the hardware 260 data transfer from any of the applications 251, 252 and 253 is directed to, the control register of the data transfer device 261, the general region of the local memory 262, or the frame buffer region of the local memory 262. Upon receipt of data transfer permission from the selected device driver, the OS 254 issues data transfer permission to the relevant application 251, 252 or 253.

In the system described above, it is not necessarily guaranteed that the order of issuance of requests to the device drivers 255, 256 and 257 matches with the order of actual data transfer performed after receipt of use permissions from the device drivers 255, 256 and 257.

Figure 26:
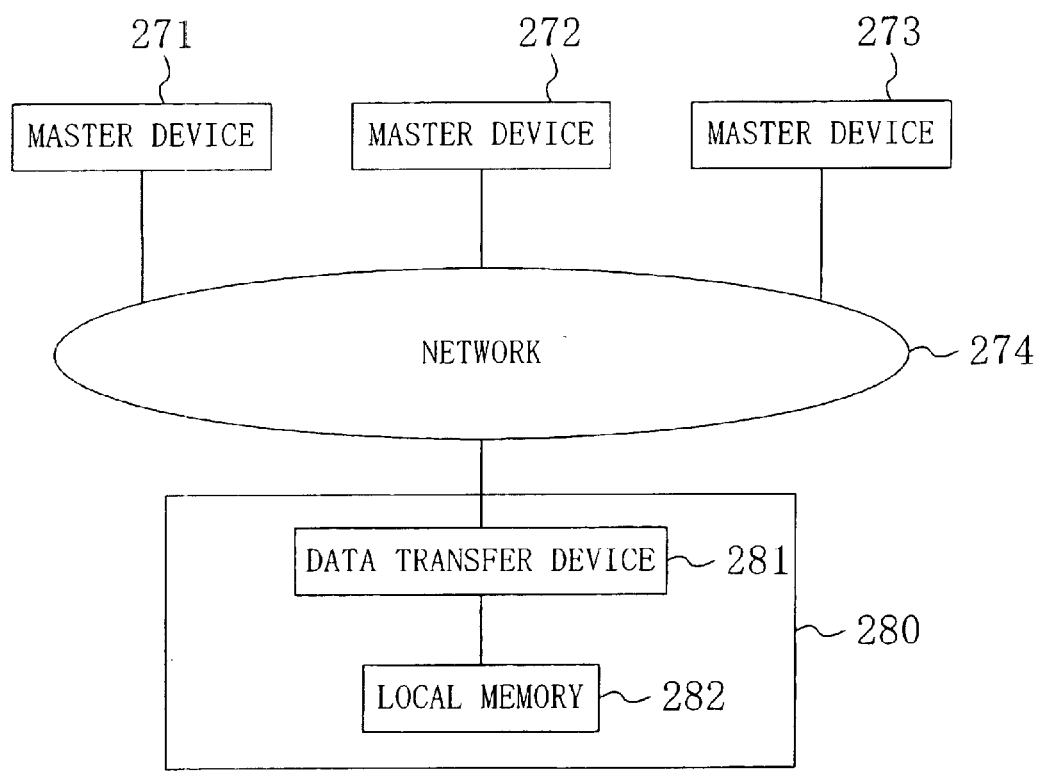
FIG. 26 is an illustration of a system including a plurality of master devices connected in one network.

FIG. 26 illustrates a system including a plurality of master devices connected on one network. In FIG. 26, a data transfer device 281 corresponds to a data transfer device including the data processor 9 and the interface section 10 in FIG. 1, and a local memory 282 corresponds to the local memory 20 in FIG. 1. The data transfer device 281 and the local memory 282 constitute a slave device 280.

The master devices 271, 272 and 273 individually transfer data to the slave device 280. In this system, the order of data transfer from the master devices 271, 272 and 273 to the slave device 280 is not necessarily guaranteed.

In view of the above, this embodiment provides a data transfer device capable of guaranteeing consistency of the data format in systems as those in FIGS. 25 and 26, in which no sequentiality is kept between the timing of setting for the control register 13 in FIG. 1 and the timing of data transfer to the general region 21 and the frame buffer region 22. To state specifically, when the access destination output from the host CPU 1 via the system bus 3, that is, the data transfer destination or the data transfer source, is an address in a predetermined region of the local memory 20, this access is forcibly regarded as access to the general region 21 (hereinafter, referred to as forced general region access).

Figure 27:
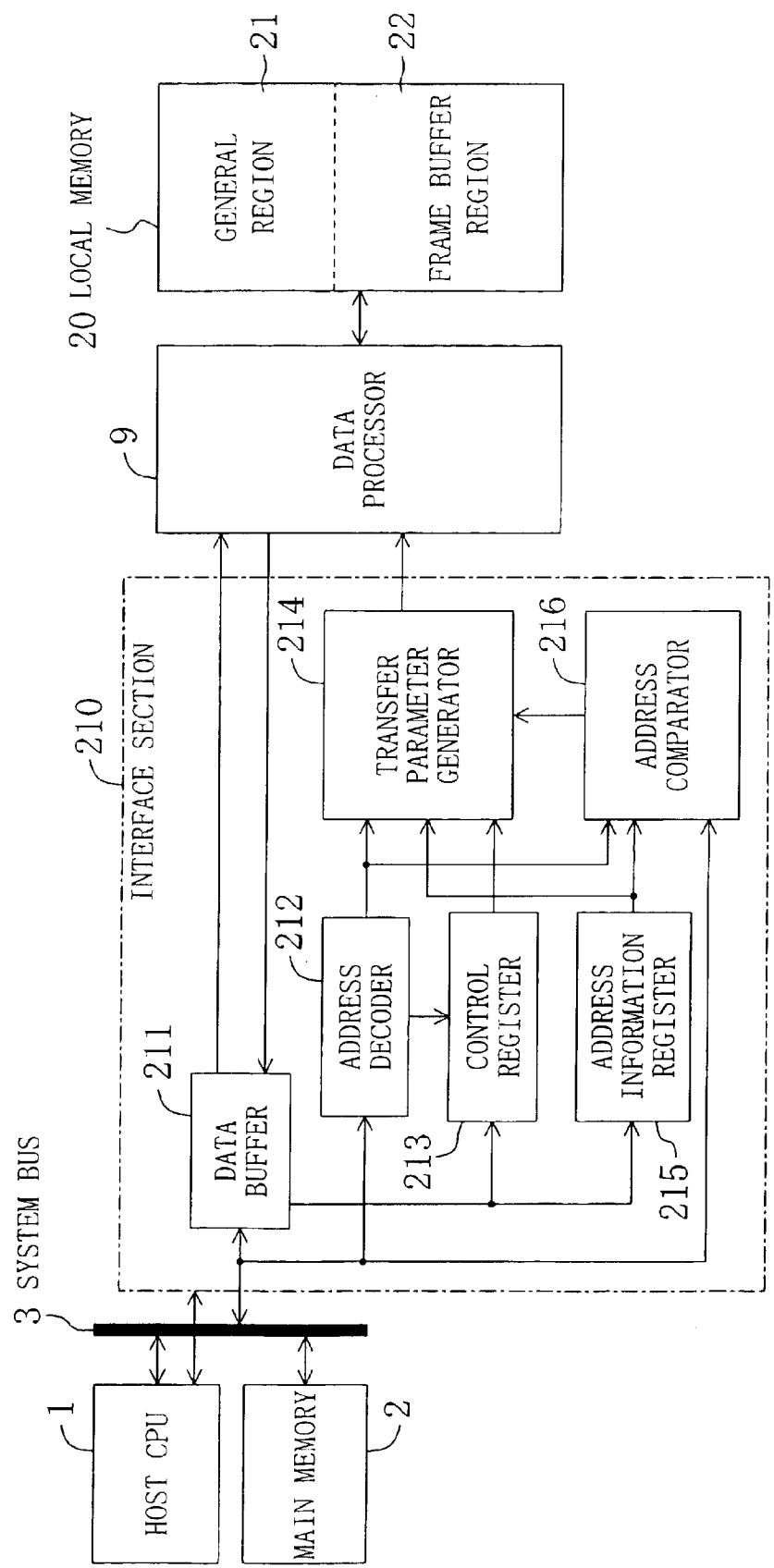
FIG. 27 is a block diagram of a data transfer device of Embodiment 3 of the present invention.
Figure 29:
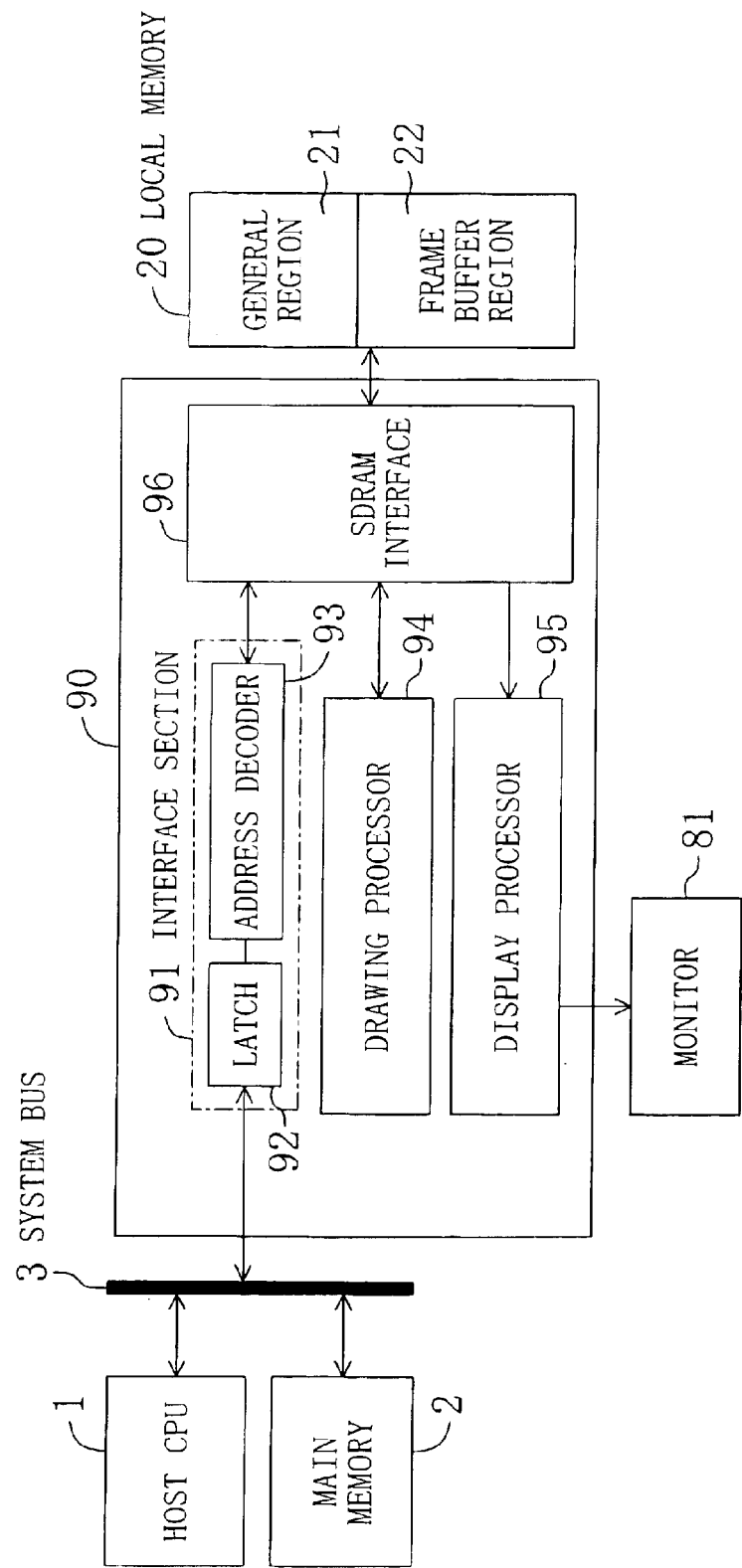
FIG. 29 is a block diagram of a conventional data transfer device.

FIG. 27 is a block diagram of a data transfer device of Embodiment 3 of the present invention. The data transfer device of FIG. 27 includes an interface section 210 and a data processor 9. The interface section 210 includes a data buffer 211, an address decoder 212, a control register 213 and a transfer parameter generator 214, in place of the data buffer 11, the address decoder 12, the control register 13 and the transfer parameter generator 14 of the interface section 10. The interface section 210 further includes an address information register 215 for storing information on setting of a general region 21 and an address comparator 216.

The operations of the data buffer 211, the address decoder 212, the control register 213 and the transfer parameter generator 214 are the same as those of the data buffer 11, the address decoder 12, the control register 13 and the transfer parameter generator 14 in FIG. 1, except for the following point.

Figure 28:
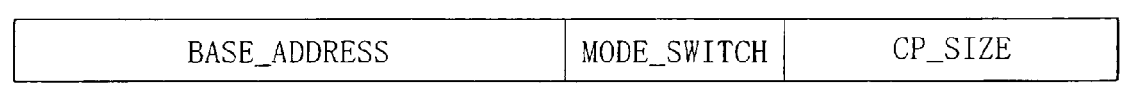

FIG. 28 illustrates address information stored in the address information register 215. The address information on the general region 21 is sent to the address information register 215 via a system bus 3 and the data buffer 211 and stored thereby by a host CPU 1. As shown in FIG. 28, the address information includes fields BASE_ADDRESS, MODE_SWITCH and CP_SIZE.

In FIG. 28, the field BASE_ADDRESS indicates a sequence of some bits from the most significant bit of a bit sequence representing a certain address in the general region 21 (the lowest address of the region, for example), which is set by the host CPU 1. The bit width of this field is 9 bits, for example.

The field MODE_SWITCH indicates whether or not forced general region access is performed, that is, whether or not a forced general region access mode is valid. The bit width of this field is one bit, for example, and the value and the forced general region access mode have the following relationship, for example.

0: the forced general region access mode is invalid
1: the forced general region access mode is valid The field CP_SIZE indicates how many bits from the most significant bit inclusive are used for comparison between the address sent from the host CPU 1 via the system bus 3 and the address information set in the field BASE_ADDRESS by the address comparator 216. The bit width of this field is 3 bits, for example, and the value of this field and the number of bits used for comparison have the following relationship, for example.

| | |
|---|---|
| 000: 9 bits | 001: 8 bits |
| 010: 7 bits | 011: 6 bits |
| 100: 5 bits | 101: 4 bits |
| 110: 3 bits | 111: 2 bits |

The address comparator 216 compares the value set in the field BASE_ADDRESS of the address information stored in the address information register 215 with the address sent via the system bus 3 based on the setting in the field CP_SIZE, and outputs the comparison result to the transfer parameter generator 214. Therefore, the position and size of the predetermined region of the local memory 20 within which the address comparator 216 judges the comparison as matching are determined by the values of the fields BASE_ADDRESS and CP_SIZE.

The transfer parameter generator 214 regards the frame buffer region 22 as the access destination in either of the following cases (e1) or (e2), and regards the general region 21 as the access destination in the other cases. Therefore, the general region 21 can be defined by the values of the fields BASE_ADDRESS and CP_SIZE.

(e1) The field RASTER_ON of the control register 213 is "1" and the field MODE_SWITCH of the address information register 215 is "0".

(e2) The field RASTER_ON of the control register 213 is "1", the field MODE_SWITCH of the address information register 215 is "1", and the comparison result by the address comparator 216 is non-matching.

An example of the operation of the data transfer device of FIG. 27 will be described. Assume that both data transfer to/from the general region 21 and data transfer to/from the frame buffer region 22 are available, and the field RASTER_ON of the control register 213 is set at "1". Also assume that the field MODE_SWITCH of the address information register 215 is set at "1" indicating that the forced general region access mode is valid.

During write access, the data buffer 211 stores data received via the system bus 3. The address decoder 212 decodes an address received via the system bus 3, determines whether the transfer destination of the data stored in the data buffer 211 is the control register 213 or the local memory 20, and outputs the determination result to the transfer parameter generator 214.

When the data transfer destination is the control register 213, the control register 213 stores the data sent from the data buffer 211 as control data. When the data transfer destination is the local memory 20, the address comparator 216 compares the address output from the host CPU 1 with the value set in the field BASE_ADDRESS of the address information register 215.

If the comparison result indicates matching between the two values, the transfer parameter generator 214 regards the general region 21 as the data transfer destination. In other words, the general region 21 is forcefully accessed as the data transfer destination. The transfer parameter generator 214 outputs only the destination head address and the number of words to be transferred among the control data shown in FIG. 13 stored in the control register 213, to the data processor 9 as transfer parameters, without address conversion.

If the comparison result indicates non-matching between the two values, the transfer parameter generator 214 regards the frame buffer region 22 as the data transfer destination. In this case, the transfer parameter generator 214 converts the byte address to coordinates according to the format information of the control data shown in FIG. 13 stored in the control register 213, to generate transfer parameters, and outputs the generated transfer parameters to the data processor 9. In either of the above cases, the data processor 9 transfers the data sent from the data buffer 211 to the local memory 20 according to the transfer parameters.

During read access, an address of data to be read is sent to the address decoder 212 via the system bus 3. The address decoder 212 decodes the address to determine which is the data transfer source, the control register 213, the address information register 215 or the local memory 20, and outputs the determination result to the transfer parameter generator 214 and the address comparator 216.

When the data transfer source is the local memory 20, the address comparator 216 compares the address sent from the host CPU 1 via the system bus 3 with the address information set in the address information register 215.

If the comparison result indicates matching between the two values, the transfer parameter generator 214 regards the general region 21 as the data transfer source. In other words, the general region 21 is forcefully accessed as the data transfer source. The transfer parameter generator 214 outputs the destination head address and the number of words to be transferred among the control data shown in FIG. 13 stored in the control register 213 to the data processor 9 as transfer parameters, without address conversion.

If the comparison result indicates non-matching between the two values, the transfer parameter generator 214 regards the frame buffer region 22 as the data transfer source. In this case, the transfer parameter generator 214 converts the byte address to coordinates according to the format information of the control data shown in FIG. 13 stored in the control register 213, to generate transfer parameters, and outputs the generated transfer parameters to the data processor 9. In either of the above cases, the data processor 9 reads data in the local memory 20 according to the transfer parameters and outputs the data to the data buffer 211. The transfer parameter generator 214 controls the data buffer 211 to store the data output from the data processor 9 and output the data to the host CPU 1 via the system bus 3.

Thus, in this embodiment, the way of generation of transfer parameters is switched according to the address of the access destination. Therefore, it is possible to provide a data transfer device capable of maintaining consistency of the data format even when no sequentiality is kept between the timing of data transfer between the system bus and the general region and the timing of data transfer between the system bus and the frame buffer region.

As described above, according to the present invention, it is possible to provide a data transfer device capable of speeding up data transfer to/from a local memory involving address generation. Since the load of the CPU and the like as a system bus master is reduced, speedup of the operation of the entire system is possible.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A data transfer device for transferring data between a local memory and a system bus, the local memory having a frame buffer region for storing pixels at addresses associated with coordinates of the pixels and a general region occupying the remaining area of the local memory, the data transfer device comprising:

an interface section for generating a transfer parameter for accessing one of the frame buffer region and the general region based on control data for controlling data transfer sent from the system bus and outputting the generated transfer parameter, in addition to transferring data to/from the system bus; and a data processor for generating an address of data to be transferred in the local memory according to the transfer parameter and transferring data to/from the local memory using the generated address, in addition to transferring data to/from the interface section, wherein the interface section further comprises:

a data buffer for storing data received from one of the system bus and the data processor, and outputting the data to the other of the system bus and the data processor not providing said data;

a control register for storing the control data; and a transfer parameter generator for generating the transfer parameter based on the control data stored in the control register and outputting the generated transfer parameter, the transfer parameter generator also controlling the data buffer, an address information register for storing an address designating the general region; and an address comparator for comparing the address stored in the address information register with an address designating an access destination sent from the system bus, and outputting the comparison result, wherein the transfer parameter generator generates a parameter for accessing the general region as the transfer parameter when the comparison result indicates that the address designating the access destination is an address in the general region, and outputs the generated parameter.

2. The device of claim 1, wherein the address comparator compares a bit sequence having a predetermined length from the most significant bit of the address stored in the address information register with a bit sequence having the same length from the most significant bit of the address designating the access destination, and the transfer parameter generator regards the address designating the access destination as an address in the general region when the comparison result from the address comparator indicates that the compared two bit sequences match with each other.

3. The device of claim 2, wherein the length of the bit sequence for comparison is set in the address information register via the system bus, and the address comparator performs the comparison according to the length of the bit sequence set in the address information register.

4. A data transfer device for transferring data between a local memory and a system bus, the local memory having a frame buffer region for storing pixels at addresses associated with coordinates of the pixels and a general region occupying the remaining area of the local memory, the data transfer device comprising:

an interface section for generating a transfer parameter for accessing one of the frame buffer region and the general region based on control data for controlling data transfer sent from the system bus and outputting the generated transfer parameter, in addition to transferring data to/from the system bus; and a data processor for generating an address of data to be transferred in the local memory according to the transfer parameter and transferring data to/from the local memory using the generated address, in addition to transferring data to/from the interface section, wherein the interface section comprises:

a plurality of system data buffers for storing data transferred to/from the system bus;

a plurality of system data buffer controllers provided for the respective system data buffers for controlling data input/output into/from the corresponding system data buffers;

a plurality of control registers provided for the respective system data buffers for storing the control data for data stored in the corresponding system data buffers;

a data transfer monitoring controller for selecting one of the plurality of system data buffers according to the states of the system data buffers, instructing the system data buffer controller for the selected system data buffer to use the system data buffer for data transfer, and outputting data indicating the selected system data buffer;

a data buffer for receiving data from one of the selected system data buffer and the data processor, storing the received data, and outputting the stored data to the other; and a transfer parameter generator for generating the transfer parameter based on control data stored in the control register corresponding to the selected system data buffer and outputting the generated transfer parameter, the transfer parameter generator also controlling the data buffer.

5. A data transfer method for transferring data between a local memory and a system bus, the local memory having a frame buffer region for storing pixels at addresses associated with coordinates of the pixels and a general region occupying the remaining area of the local memory, the data transfer method comprising the steps of:

generating a transfer parameter for accessing one of the frame buffer region and the general region based on control data for controlling data transfer sent from the system bus, in addition to transferring data to/from the system bus;

generating an address of data to be transferred in the local memory according to the transfer parameter and transferring data to/from the local memory using the generated address, and comparing an address designating the general region with an address designating an access destination sent from the system bus, wherein in the step of generating a transfer parameter, a parameter for accessing the general region is generated as the transfer parameter when the comparison result indicates that the address designating the access destination is an address in the general region.

* * * * *

UNITED STATES PATENT AND TRADEMARK OFFICE
CERTIFICATE OF CORRECTION

PATENT NO. : 6,927,776 B2
DATED : August 9, 2005
INVENTOR(S) : Yoshiteru Mino et al.

It is certified that error appears in the above-identified patent and that said Letters Patent is hereby corrected as shown below:

Title page,
Item [56], References Cited, U.S. PATENT DOCUMENTS, add
-- 6,727,903     4/2004         Yamada et al. --.
FOREIGN PATENT DOCUMENTS, add
-- JP    2000-293372    10/2000
   JP    2000-285013    10/2000 --.

Signed and Sealed this

Twenty-fourth Day of January, 2006

JON W. DUDAS
*Director of the United States Patent and Trademark Office*

UNITED STATES PATENT AND TRADEMARK OFFICE
CERTIFICATE OF CORRECTION

PATENT NO. : 6,927,776 B2  Page 1 of 1
DATED : August 9, 2005
INVENTOR(S) : Yoshiteru Mino et al.

It is certified that error appears in the above-identified patent and that said Letters Patent is hereby corrected as shown below:

<u>Title page,</u>
Item [56], References Cited, U.S. PATENT DOCUMENTS, after "5,640,545 A" insert -- 5,717,949 A  *  2/1998  Ito ………....710/4 --.

Signed and Sealed this

Twenty-fifth Day of April, 2006

JON W. DUDAS
*Director of the United States Patent and Trademark Office*